US007840372B2

(12) United States Patent
Lu

(10) Patent No.: US 7,840,372 B2
(45) Date of Patent: Nov. 23, 2010

(54) SELF-CALIBRATION METHOD AND APPARATUS FOR ON-AXIS ROTARY ENCODERS

(75) Inventor: Xiaodong Lu, Vancouver (CA)

(73) Assignee: The University of British Columbia (CA)

( * ) Notice: Subject to any disclaimer, the term of this patent is extended or adjusted under 35 U.S.C. 154(b) by 99 days.

(21) Appl. No.: 12/168,789

(22) Filed: Jul. 7, 2008

(65) Prior Publication Data
US 2009/0030638 A1    Jan. 29, 2009

Related U.S. Application Data

(60) Provisional application No. 60/929,655, filed on Jul. 6, 2007.

(51) Int. Cl.
G01C 9/00 (2006.01)
(52) U.S. Cl. .................................................. 702/151
(58) Field of Classification Search .................. 702/94, 702/150, 151; 73/1.75
See application file for complete search history.

(56) References Cited

U.S. PATENT DOCUMENTS

| 4,593,193 | A  | 6/1986  | Michaelis |
| 5,138,564 | A  | 8/1992  | de Jong   |
| 5,889,534 | A  | 3/1999  | Johnson   |
| 6,145,368 | A  | 11/2000 | Klein     |
| 6,304,825 | B1 | 10/2001 | Nowak     |
| 2004/0179885 | A1 | 9/2004 | Adkins    |

FOREIGN PATENT DOCUMENTS

| EP | 1103815    | 5/2001  |
| EP | 1480004    | 11/2004 |
| WO | 03036238   | 5/2003  |
| WO | 2005124289 | 12/2005 |

OTHER PUBLICATIONS

Estler, W.T., Queen, Y.T., 1993, An advanced Angle Metrology System, Annals of the CIRP, 42(1):573-576.

(Continued)

Primary Examiner—Drew A Dunn
Assistant Examiner—Stephen J Cherry
(74) Attorney, Agent, or Firm—Jeffer Mangels Butler & Mitchell LLP

(57) ABSTRACT

A self-calibration method and apparatus for on-axis rotary encoders comprising the steps of: receiving output signals from a detector during a spindle-free response period, the signals including a plurality of data sets wherein each data set comprises the periods between sampling events occurring in one revolution of the encoder at an angular speed; selecting a data set pair from the output signals, wherein the data set pair contains two linearly uncorrelated data sets; defining a model of the angular distances between each sampling event occurring in one revolution of the encoder as a function of one or more damping coefficients and the periods between each sampling event as contained in the data set pair; solving the model for the angular distances for the data set pair using circular closure and dynamic reversal techniques; and establishing an encoder error map using the selected solved angular distances from the model.

88 Claims, 14 Drawing Sheets

OTHER PUBLICATIONS

Estler, W.T., 1998, Uncertainty Analysis for Angle Calibrations using Circle Closure, J. Res. Natl. Inst. Stand. Technol., 103(2):141-151.

Filatov, Y.V., Loukianov, D.P., Probst, R., 1997, Dynamic Angle Measurement by Means of a Ring Laser, Metrologia, 34:343-351.

Geckeler, R.D., Fricke, A., Elster, C., Sep. 20, 2006, Calibration of Angle Encoders Using Transfer Functions, Meas. Sci. Technol, 17:2811-2818.

Lu, X.D. and Trumper, D.L., Self-Calibration of On-Axis Rotary Encoders, Annals of the CIRP, vol. 56/1/2007.

Lu, Xiaodong and Trumper, David L., Self-Calibration for Air-Bearing Mounted Rotary Encoders, Oct. 15, 2006.

Masuda, T., Kajitani, M., 1989, An Automatic Calibration System for Angular Encoders, Precision Engineering, 11 (2):95-100.

Moore, W.R., 1970, Foundations of Mechanical Accuracy, Chapter 3, pp. 204-250. The Moore Special Tool Co., Bridgeport, CT, USA.

Orton, P.A., Poliakoff, J.F., Hatiris, E., Thomas, P.D., 2001, Automatic Self-Calibration of an Incremental Motion Encoder, 2001 IEEE Instrum. Meas. Technol. Conf. , 1617-1618.

Probst, R., Wittekopf, R., Krause, M., Dangschat, H., Ernst, A., Mar. 4, 1998, The New PTB Angle Comparator, Meas. Sci. Techno., 9:1059-1066.

Watanabe, T., Fujimoto, H., Nakayama, K., Masuda, T., Kajitani, M., 2003, Automatic High Precision Calibration System for Angle Encoders, Proc. of SPIE, 5190:400-409.

Watanabe, T., Fujimoto, H., Masuda, T., 2005, Self-Calibration Rotary Encoder, 7th Int., Sym, Meas., Technol. Intellig. Instrum., 240-245.

Zhang, G.X., Wang, C.H., Li, Z., 1994, Improving the Accuracy of Angle Measurement System with Optical Grating, Annals of the CIRP, 43(1):457-460.

SELF-CALIBRATION METHOD AND APPARATUS FOR ON-AXIS ROTARY ENCODERS

FIELD OF INVENTION

The present invention relates to a self-calibration method and apparatus for on-axis rotary encoders, and apparatus calibrated by such method and apparatus.

BACKGROUND OF THE INVENTION

High-accuracy angular encoders are widely used for rotational axis position measurement in ultra-precision manufacturing equipment and measurement instruments, such as diamond turning machines for free-form optical surface generation. A typical rotary encoder is made of a glass disk with a fine grating pattern and a scanning read head unit. Digital pulse trains are output from the read head to represent the disk rotary position. The angular measurement accuracy of such a rotary encoder is highly dependent on the grating pattern manufacturing error (uniformity and eccentricity of the graduation), encoder disk installation eccentricity on the rotary axis, read head alignment, and so on. Repeatable components of encoder error can in principle be eliminated through calibration to improve accuracy. Such calibration methods are classified into two categories: comparison calibration and self-calibration.

Comparison calibration is based on measuring the difference between a higher-accuracy angle standard and the axis under calibration. Polygon mirrors are often employed as angle standards, and the difference is usually measured by photo-electric autocollimators. However, the number of calibration points is limited by the polygon facet number. Renishaw has commercialized a rotary axis calibration system that is composed of a 72-tooth index table with 1 arc-sec accuracy and an angle-measurement laser interferometer (Renishaw User Manual, 2002, Rotary Axis Calibration Using the RX10 Rotary Indexer). As this system requires the index table to unlock and lock down at every tooth position, it is time-consuming and the accuracy is limited by both the index table and the interferometer. As an alternative approach, a ring-laser based goniometer can be used to calibrate rotary axes (Filatov, Y. V., Loukianov, D. P., Probst, R., 1997, Dynamic Angle Measurement by Means of a Ring Laser, Metrologia, 34:343-351).

To avoid the use of external standards and associated errors, many self-calibration methods have been developed. Circle closure has been frequently used to cross-calibrate index tables at Moore Special Tool (Moore, W. R., 1970, Foundations of Mechanical Accuracy, The Moore Special Tool Co., Bridgeport, Conn., USA) and at NIST (Estler, W. T., Queen, Y. T., 1993, An Advanced Angle Metrology System, Annals of the CIRP, 42/1:573-576 and Estler, W. T., 1998, Uncertainty Analysis for Angle Calibrations Using Circle Closure, J. Res. Natl. Inst. Stand. Technol., 103/2: 141-151). The calibrated tables can be used as a reference standard in a comparison calibration system. Masuda and Kajitani (Masuda, T., Kajitani, M., 1989, An Automatic Calibration System for Angular Encoders, Precision Engineering, 11/2:95-100) developed a calibration system for angular encoders in which six read-heads were unevenly spaced around a master scale to self-check its accuracy. This self-calibrated master scale was then used to calibrate other encoders installed on the system axis via comparison. Also, Watanabe et al (Watanabe, T., Fujimoto, H., Nakayama, K., Masuda, T., Kajitani, M., 2003, Automatic High Precision Calibration System for Angular Encoder, Proc. of SPIE, 5190:400-409) further developed an angle encoder calibration system that automatically derives Fourier components of encoder error by cross-checking graduation errors of two coaxially installed encoder disks at multiple read-head positions. Based on this principle, a simplified system was presented using five read-heads evenly distributed around a single optical disk such that graduation errors excepting 5th order components were self-calibrated (Watanabe, T., Fujimoto, H., Masuda, T., 2005, Self-Calibration Rotary Encoder, 7th Int., Sym, Meas., Techol. Intellig. Instrum., 240-245). Zhang and Li (Zhang, G. X., Wang, C. H., Li, Z., 1994, Improving the Accuracy of Angle Measurement System with Optical Grating, Annals of the CIRP, 43/1:457-460) presented an angle measurement system with sine function transmissivity grating disks and four unevenly spaced read-heads. At PTB (Probst, R., Wittekopf, R., Krause, M., Dangschat, H., Ernst, A., 1998, The New PTB Angle Comparator, Meas. Sci. Technol., 9:1059-1066), an angle comparator was constructed using 15 read-heads to achieve 0.01 arc-sec uncertainty. In this system, the encoder errors at 128 circle divisions can be self-calibrated. Using Fourier series, Geckeler (Geckeler, R. D., Fricke, A., Elster, C., 2006, Calibration of Angle Encoders Using Transfer Functions, Meas. Sci. Technol., 17:2811-2818) described a calibration method using two rotary tables and a polygon mirror. In all the above references, self-calibration methods were developed for special encoder and spindle setups (typically using multiple read-heads), but these methods cannot be directly applied to calibrate general encoders with a single read-head. Further, the encoders under calibration are usually required to be installed on the calibration system axis.

Ideally, encoders should be ideally calibrated on their own application axes because significant errors are introduced by the disk installation and read-head alignment. In Michaelis, T. D., 1986, Apparatus and Method for Generating Calibrated Optical Encoder Pulses, U.S. Pat. No. 4,593,193, a method based on an air-bearing spindle in free rotation was proposed to correct encoder pulses. However, the calibration result can only be applied to the speed used in calibration. In Orton, P. A., Poliakoff, J. F., Hatiris, E., Thomas, P. D., 2001, Automatic Self-Calibration of an Incremental Motion Encoder, 2001 IEEE Instrum. Meas. Technol. Conf., 1617-1618, a self-calibration method was described to measure disk graduation error at constant spindle speed. However, it is impractical to control the spindle speed accurately enough for calibration purposes, due to imbalance, feedback sensor errors, and motor driving torque ripple.

SUMMARY OF THE INVENTION

It is an object of the invention to provide a solution to at least some of the deficiencies or problems in prior art approaches to calibrating rotary encoders.

According to one aspect of the invention, there is provided a method of calibrating a rotary encoder. The encoder comprises a detectable portion having a plurality of detectable elements about a rotational axis of the encoder and a detector operable to detect the detectable elements and generate an output signal in response to movement of the detectable portion about the rotational axis of the encoder. The method comprises the steps of:

a) rotating the encoder to a selected first speed then allowing the encoder to freely decelerate to a selected second speed over a spindle-free response period;

b) during the spindle-free response period, receiving output signals from the detector, the signals including a plurality of data sets wherein each data set comprises the periods between sampling events occurring in one revolution of the encoder at an angular speed, each sampling event representing a transition between successive detectable elements of the encoder and each sampling event being spaced an angular distance apart from the preceding sampling event;

c) selecting a data set pair from the output signals, wherein the data set pair contains two linearly uncorrelated data sets;

d) defining a model of the angular distances between each sampling event occurring in one revolution of the encoder as a function of one or more damping coefficients and the periods between each sampling event as contained in the data set pair;

e) solving the model for the angular distances for the data set pair using circular closure and dynamic reversal techniques; and f) establishing an encoder error map using the selected solved angular distances from the model.

Additional steps to the method can include: selecting a plurality of data set pairs from the output signals in step (c); solving the model for the angular distances for each of the plurality of data set pairs in step (e); then in step (f): calculating the repeatability of the angular distances solved for each of the plurality of data set pairs; selecting the angular distances solved for one of the plurality of data set pairs based on the repeatability of the angular distances as compared to the repeatability of the angular distances solved for other data set pairs; and establishing an encoder error map using the selected solved angular distances from the model.

In the model, an angular distance $\Delta_k$ between sampling events k and k−1 as can be defined by:

$$\Delta_k = T_k(\omega_0 + ak + bk^2)$$

wherein
$\omega_0$ is the initial angular speed,
$T_k$ is the period between sampling events k and k−1,
a is a first order damping coefficient, and
b is a second order damping coefficient, and $\omega_0$ is the initial spindle speed, is solved by circular closure and dynamic reversal techniques. The circle closure technique can be applied to constrain the sum of the angular distances between sampling events to one revolution of the encoder, resulting in vector equation:

$$m = \Delta + aU + bV$$

which expresses a measurement result m as the sum of angular distance vector $\Delta$ and an artifact $aU+bV$. This artifact $aU+bV$ can be is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair. The vectors $U_1$, $V_1$, $U_2$, and $V_2$ can be linearly uncorrelated. The vectors $U_1$, $V_1$, $U_2$, and $V_2$ can be linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder, or alternatively, within a range from twenty-five percent of the total number of sampling events occurring in one revolution of the encoder to seventy-five percent of the total number of sampling events occurring in one revolution of the encoder, or alternatively by half of the total number of sampling events occurring in one revolution of the encoder.

The vector pair equations can be combined to cancel angular distance vector A and to yield a linear equation for unknown parameters $a_1$, $b_1$ and $a_2$, $b_2$ and then to approximate first order damping coefficients $a_1$, and $a_2$ and second order damping coefficients $b_1$ and $b_2$ by applying a least-square fit to the linear equation. The approximated damping coefficients $a_1$, $b_1$, $a_2$, $b_2$ can be applied to the vector pair equations to provide an equation for determining angular distance between sampling intervals as:

$$\overline{\Delta} = m_1 - \overline{a_1}U_1 - \overline{b_1}V_1 \text{ or } \overline{\Delta} = m_2 - \overline{a_2}U_2 - \overline{b_2}V_2$$

The method can be enhanced by carrying out the following steps in step (f):

defining an enhanced model of the angular distances between each sampling event occurring in one revolution of the encoder as a function of one or more damping coefficients, the solution of a previously solved model, and the periods between each sampling event as contained in each data set pair;

selecting the angular distances solved for a data set pair using the previously solved model;

repeatedly solving the enhanced model for the angular distances using circular closure and dynamic reversal techniques until the variation between successive solved angular distances is below a convergence threshold; and establishing an encoder error map using the selected solved angular distances from the enhanced model.

In the enhanced model, an angular distance $\Delta_k$ between sampling events k and k−1 can be defined by:

$$\Delta_k = T_k R_k [\omega_0 + aP_k + bP_k^2]$$

wherein
$\omega_0$ is the initial angular speed,
$T_k$ is the period between sampling events k and k−1,
$R_k$ is a correction term defined by $R_k = (e^{cT_k} - 1)/cT_k$
c is defined by $c = -\overline{a}/\Delta_0$
$\overline{a}$ is an approximation of the first order damping coefficient previously solved using the model
$\Delta_0$ is the nominal angular distance between sampling events,
a is a first order damping coefficient,
b is a second order damping coefficient, and $\omega_0$ is the initial spindle speed,
P is defined by $$P_k = \sum_{i=1}^{k} \frac{\overline{\Delta}_i}{\Delta_0}, \text{ and}$$

$\overline{\Delta}_i$ is an approximation of angular distance $\Delta_k$ between sampling events k and k−1 from the previously solved model, is solved by circular closure and dynamic reversal techniques.

According to another aspect of the invention, a system for calibrating a rotary encoder is provided. The encoder comprises a detectable portion having a plurality of detectable elements about a rotational axis of the encoder and a detector operable to detect the detectable elements and generate an output signal in response to movement of the detectable portion about the rotational axis of the encoder. The system comprises a timer and a processor communicative with the timer. The timer is operable to receive output signals from the detector during a spindle-free response period, wherein: the output signals comprise a plurality of data sets, each data set comprises the periods between sampling events occurring in one revolution of the encoder at an angular speed, each sampling event representing a transition between successive detectable elements of the encoder and each sampling event being spaced an angular distance apart from the preceding sampling event. The processor is operable to receive the plurality of data sets from the timer, and has a memory with statements and instructions stored therein for execution by the processor of the following steps:

- controlling a motor to rotate the encoder to a selected first speed then to allow the encoder to freely decelerate to a selected second speed over the spindle free response period;
- selecting a data set pair from the plurality of data sets, wherein the data set pair contains two linearly uncorrelated data sets;
- defining a model of the angular distances between each sampling event occurring in one revolution of the encoder as a function of one or more damping coefficients and the periods between each sampling event as contained in the data set pair;
- solving the model for the angular distances for the data set pair using circular closure and dynamic reversal techniques; and
- establishing an encoder error map using the selected solved angular distances from the model.

In the system, the processor can be a general purpose computer, and the timer can be a field programmable gate array. Alternatively, the processor and timer can be a controller for controlling machinery having the encoder therein.

According to yet another aspect of the invention, there is provided a calibrated rotary encoder system comprising a rotary encoder and a controller. The encoder comprises a detectable portion having a plurality of detectable elements about the rotational axis of the encoder; and a detector operable to detect the detectable elements and generate an output signal in response to movement of the detectable portion about the rotational axis of the encoder. The controller is communicative with the encoder and has a memory with an encoder error map stored thereon and statements and instructions for execution by the controller to apply the encoder error map to output signals received from the encoder to produce calibrated output signals. The encoder error map is derived by:

- rotating the encoder to a selected first speed then allowing the encoder to freely decelerate to a selected second speed over a spindle-free response period;
- during the spindle-free response period, receiving output signals from the detector, the signals including a plurality of data sets wherein each data set comprises the periods between sampling events occurring in one revolution of the encoder at an angular speed, each sampling event representing a transition between successive detectable elements of the encoder and each sampling event being spaced an angular distance apart from the preceding sampling event;
- selecting a data set pair from the output signals, wherein the data set pair contains two linearly uncorrelated data sets;
- defining a model of the angular distances between each sampling event occurring in one revolution of the encoder as a function of one or more damping coefficients and the periods between each sampling event as contained in the data set pair;
- solving the model for the angular distances for the data set pair using circular closure and dynamic reversal techniques; and
- establishing the encoder error map using the selected solved angular distances from the model.

According to yet another aspect of the invention, there is provided a computer-readable medium having statements and instruction stored therein for execution by a processor for calibrating a rotary encoder comprising a detectable portion having a plurality of detectable elements about the rotational axis of the encoder and a detector operable to detect the detectable elements and generate an output signal in response to movement of the detectable portion about the rotational axis of the encoder. The statements and instructions when executed by the processor carry out the steps of:

- rotating the encoder to a selected first speed then allowing the encoder to freely decelerate to a selected second speed over a spindle-free response period;
- during a spindle-free response period wherein the encoder is rotated to a selected first speed then allowed to freely decelerate to a selected second speed, receiving output signals from the detector, the signals including a plurality of data sets wherein each data set comprises the periods between sampling events occurring in one revolution of the encoder at an angular speed, each sampling event representing a transition between successive detectable elements of the encoder and each sampling event being spaced an angular distance apart from the preceding sampling event;
- selecting a data set pair from the output signals, wherein the data set pair contains two linearly uncorrelated data sets;
- defining a model of the angular distances between each sampling event occurring in one revolution of the encoder as a function of one or more damping coefficients and the periods between each sampling event as contained in the data set pair;
- solving the model for the angular distances for the data set pair using circular closure and dynamic reversal techniques; and
- establishing an encoder error map using the selected solved angular distances from the model.

DETAILED DESCRIPTION OF EMBODIMENTS OF THE INVENTION

The embodiments of the present invention relate to a self-calibration method and apparatus for on-axis rotary encoders, and a rotary encoder calibrated by such method and apparatus.

Rotary Encoder Apparatus and Rotary Encoder Calibration System

Figure 1:
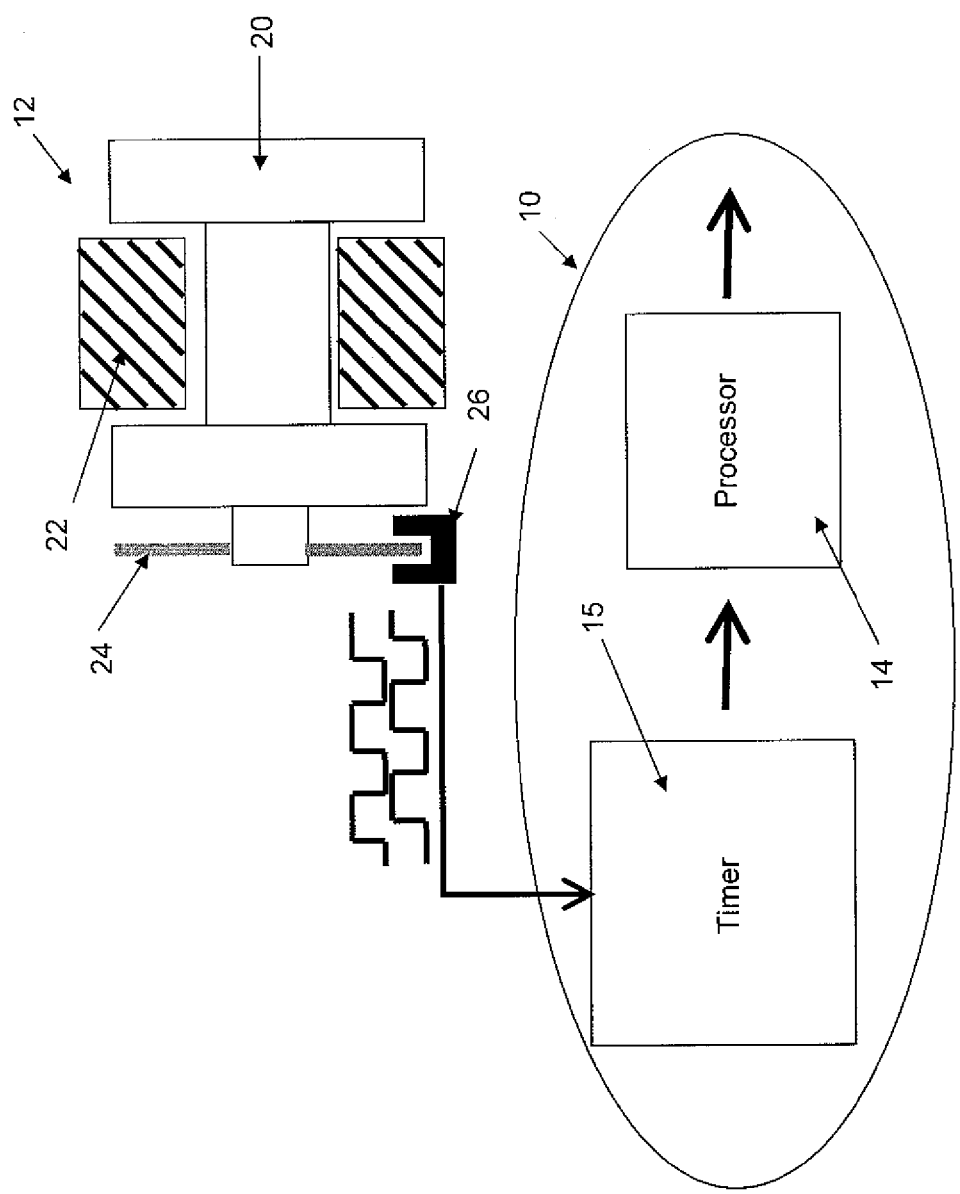
FIG. 1 is a diagram of a rotary encoder calibration system.

Referring to FIG. 1, a rotary encoder calibration system 10 for calibrating a rotary encoder 12 generally comprises: a timer 15 communicative with the encoder 12; and a processor 14 communicative with the timer 15 and having encoded thereon a self-calibration algorithm.

The rotary encoder 12 is part of a motorized spindle which also comprises a rotor 20, a stator 22, and a motor (not shown) coupled to the rotor 20 and operable to rotate the rotor 20 relative to the stationary stator 22. Such a spindle is known in the art and can be for example a Professional Instrument 4R Twin-mount motorized air bearing spindle. The rotary encoder 12 provides high accuracy positional measurement in various types of machinery, including ultra-precision manufacturing and measurement instruments such as diamond turning machines for free-form optical surface generation. The encoder 12 includes a detectable portion 24 attached to the rotor 20 and a stationary detector 26. The detectable portion 24 in this embodiment is an optical disk that is fixed to the rotor 20 and rotates with the rotor 20. The optical disk 24 contains a plurality of detectable elements 28 each consisting of an opaque portion and a transparent portion, i.e. a portion that is transparent through the thickness of the optical disk 24. The detectable elements 28 are located adjacent each other on the disk 24 and circumferentially about the rotational axis of the encoder 12. Each detectable element 28 spans an angular distance on the optical disk 24. As will be discussed in detail below, detection of the elements 28 is used to precisely determine the angular position of each element 28 in the encoder 12 which in turn is used to calibrate the encoder 12 for use in the machinery. A known example of such an encoder is Heidenhain bearing-less optical encoder (ERO 1324-004-2500) having an optical disk with 2500 spaced grating lines serving as the detectable elements.

Detector 26 is a read head unit fixed to a spindle housing (not shown) and detects the transition between detectable elements 28 as the optical disk 24 rotates with the rotation of the rotor 20. Detector 26 is comprised of one or more LED or other suitable light sources and one or more photo diodes or other suitable light receivers. The light source directs light at the detectable elements 28 of the optical disk 24, while the light receiver detects changes in the intensity of the light as it is affected by the detectable elements. Specifically, the light source is mounted on the detector 26 on one side of the optical disk 24 and faces the optical disk 24, and the light receiver is mounted on the detector 26 on the other side of the optical disk 24 and also faces the light source. As the optical disk 24 rotates, light from the light source will be alternately blocked by the opaque portions of each detectable element 28, and will pass through the transparent portions of each detectable element 28 and reach the light receiver on the other side of the optical disk 24. When the light receiver detects a change in light intensity at or beyond a selected threshold, the light receiver generates one or more output signals. This output signal is sent by the detector 26 to the timer 15. Each output signal in effect contains information on the transition between successive detectable elements as detected by the light receiver.

In the present embodiment, encoder 12 is a quadrature encoder comprising two light sources and two corresponding light receivers as is known in the art. As such, encoder 12 generates two output signals (A and B) that are out of phase with one another in order to allow the direction of rotation of encoder 12 to be determined. In other words, the light source/receiver pairs are located such that that the transition between successive detectable elements measured by one pair occurs at a different time that the transition between successive detectable elements measured by the other pair. Encoder 12 is also configured to generate an index signal that produces a pulse once per revolution. Alternatively, the encoder 12 can have more than two light source/receiver pairs, thereby producing one output signal for each pair. In the further alternative, the encoder 12 can have only a single light source and receiver pair, thereby producing a single output signal. In such case, the direction of rotation of the encoder 12 cannot be determined from measurement of the output signals alone, and rotational direction is provided to the processor 14 as a separate input.

Figure 2:
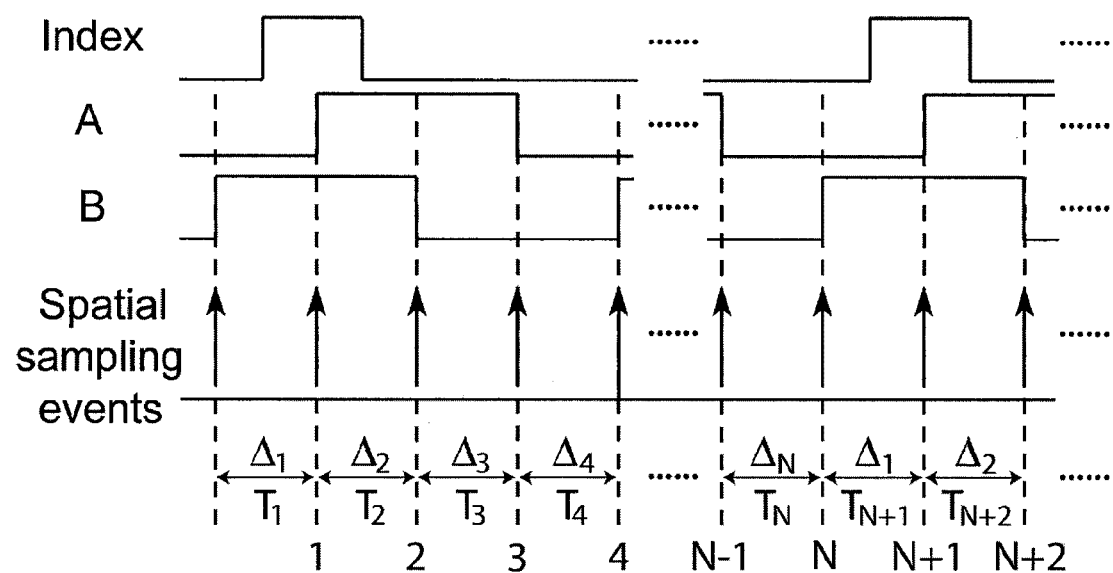
FIG. 2 is a graph of output signals generated by the rotary encoder calibration system shown in FIG. 1.

FIG. 2 shows the signals generated by encoder 12. The output signals A and B are in the form of square waves, the rising and falling edges of which can be considered as sampling events. Sampling events represent the transitions between successive detectable elements detected by detector 26 as the optical disk 24 rotates about the rotational axis of encoder 12. Each sampling event is spaced apart from the preceding sampling event by an angular distance $A_i$, and the time between each sampling event and the preceding sampling event defines a period $T_i$.

The timer 15 in the present embodiment is a field programmable gate array with a high frequency clock; however, other suitable types of timing electronics can be used as is known to one skilled in the art. The timer 15 is communicative with the encoder 12 to receive the output signals from the detector 26. The timer 15 measures the period between sampling events identified in the output signal and transmits this timing information to the processor 14.

The processor 14 in the present embodiment is a general purpose computer that is communicative with the timer 15 and the spindle motor. The processor 14 in operation instructs the spindle motor to accelerate the spindle/encoder 12 to a selected first speed then decouples the motor from the encoder 12. Upon decoupling, the timer 15 receives output signals from the detector 26 corresponding to the detection of detectable elements 28 as the rotor 20 and optical disk 24 decelerates to a selected second speed ("spindle free response period"). The timing information measured by the timer 15 is communicated to the processor 14 and processed by the processor 14 to produce an encoder error map for the encoder 12. The encoder error map is then provided to a controller in the machinery which communicates with the encoder 12 during normal operation of the machinery. The controller uses the encoder error map to improve the accuracy of the angular positions identified in the output signals of the encoder 12 during normal operation of the machinery.

The processing by the processor 14 is carried out in accordance with program code encoded on a memory (not shown) of the processor 14. The program code is an expression of steps of a self-calibration method described in the next section of this Detailed Description.

In the present embodiment, the processor 14 is a general purpose computer and the timer 15 is a field programmable gate array. The processor 14 and the timer 15 are separate devices that are external to the encoder 12 and the machinery for which the encoder 12 is associated. As such, the processor 14 and timer 15 may be utilized to calibrate the encoders of a variety of different machinery. In the alternative, the processor 14 and timer 15 can be integrated into a single electronic device that performs the functions of the processor 14 and the timer 15 as described above. The encoder error map determined by the integrated device is communicated to a general purpose computer or the controller in the machinery which communicates with the encoder 12. The integrated device may also be utilized to calibrate the encoders of a variety of different machinery.

In the further alternative, the processor 14 and timer 15 can be integrated into the machinery for which the encoder 12 is associated. The processor 14 can be the controller in the machinery which communicates with the encoder 12 during normal operation of the machinery, and the timer 15 can be timing electronics integrated into the machinery or controller. In the further alternative, the processor 14 and timer 15 can be integrated into the encoder 12. The integrated encoder is capable of calibrating the encoder 12, as well as, applying the encoder error map to correct the output signals transmitted from the encoder 12 to the controller of the machinery.

Self-Calibration Method

In an ideal rotary encoder, the angular distance $\Delta_i$ between each sampling event is a nominal value $\Delta_0$ equal to 1/N, where N is the number of sampling events occurring in one revolution of the encoder. Thus, the angular position of the encoder can be determined by multiplying the number of sampling events by the nominal value $\Delta_0$. However, as discussed above, the angular distances between sampling events inevitably vary from the nominal value due to encoder errors, such as, scale graduation non-uniformity, encoder disk installation eccentricity, read-head alignment, etc.

The rotary encoder 12 can be calibrated to account for these encoder errors by modelling the response of the encoder 12 as a function of the periods $T_i$ between sampling events measured during a spindle free response period of the encoder. The spindle free response of the encoder is obtained by using the spindle motor to accelerate the rotor 20 and attached optical disk 24 until the rotor 20 reaches a selected first speed, and then turning off or decoupling the spindle motor and continuously measuring the periods between sampling events until the spindle decelerates to a selected second speed. By taking calibration measurements during the spindle free response period, motor driving torque disturbances on the spindle speed are avoided. The measured periods are then processed to produce an encoder error map which can be applied to correct each of the measurements taken by the encoder during regular spindle operation to improve the encoder accuracy.

The processor 14 is programmed to execute a basic calibration model stored on a memory of the processor 14; alternatively or additionally, the processor 14 can be programmed to execute an enhanced calibration model also stored on the memory of the processor 14. The basic model is directed for use with high precision on-axis rotary encoders having bearings substantially unaffected by Coulomb friction, such as, air or hydrostatic oil bearings. A description of the basic and enhanced calibration models follow below:

Basic Model

The dynamics of a spindle can be expressed as:

$$d\omega/dt + c\omega = 0 \qquad (1)$$

where $\omega$ is spindle speed, t is time, and c is normalized damping (the ratio of spindle damping to rotor moment of inertia). In addition, the spindle speed is the temporal derivative of spindle angle expressed as:

$$\omega = d\theta/dt \qquad (2)$$

where $\theta$ is the spindle angle. By combining Equations (1) and (2), the dynamics of the spindle can be expressed in the angle domain as:

$$d\omega/d\theta = -c \qquad (3)$$

In one revolution of the encoder during which there is a small change in spindle speed, the effect of nonlinear damping is much less than the constant damping component. However, to accommodate for a speed-dependent component of nonlinear damping, the normalized damping can be expressed as:

$$c = c_0 + c_1(\omega - \omega_0) \qquad (4)$$

where $c_0$ is a constant damping coefficient, $c_1$ is a speed-dependent damping coefficient and $\omega_0$ is the initial spindle speed. Combining Equations (3) and (4) results in:

$$d\omega/d\theta = -c_0 - c_1(\omega - \omega_0) \qquad (5)$$

where $\theta_0$ is the initial spindle position. Integrating Equation (5) results in the spindle speed as a function of spindle angle, expressed as:

$$\omega(\theta) = \omega_0 + \frac{c_0}{c_1}(e^{-c_1(\theta-\theta_0)} - 1). \qquad (6)$$

Applying a Taylor expansion to Equation (6) results in:

$$\omega(\theta) = \omega_0 - c_0(\theta-\theta_0)(1 - c_1(\theta-\theta_0)/2) + \omega_e \qquad (7)$$

where $\omega_e$ carries higher order terms such that $|\omega_e| < c_0 c_1^2 (\theta - \theta_0)^3/6$. Neglecting the higher order terms, $\omega_e$, the spindle speed at the kth sampling event $\theta = \theta_k$ is given by the quadratic expression:

$$\omega_k = \omega_0 + a\left(\frac{\theta_k - \theta_0}{\Delta_0}\right) + b\left(\frac{\theta_k - \theta_0}{\Delta_0}\right)^2 \qquad (8)$$

where $a = -c_0 \Delta_0$ is a first order damping coefficient and $b = c_0 c_1 \Delta_0^2/2$ is a second order damping coefficient. Equation (8) is not intended to describe the dynamics of the spindle over a large speed range, but is only required to be accurate within one revolution of the spindle for calibration purposes, typically with a very small associated change in spindle speed.

To simplify Equation (8), the angular distance between sampling events can be approximated as the nominal value $\Delta_0$, such that $\theta_k \approx \theta_0 + k\Delta_0$. Thus, Equation (8) can be expressed as:

$$\omega_k = \omega_0 + ak + bk^2 \qquad (9)$$

In addition, the spindle speed at the kth sampling event can be approximated as the average spindle speed between sampling events as:

$$\omega_k = \Delta_k / T_k \quad (10)$$

wherein $\Delta k$ is the angular distance between sampling events k and k−1, and $T_k$ is the period between sampling events k and k−1. Combining Equations (9) and (10) yields:

$$\Delta_k = T_k(\omega_0 + ak + bk^2), \text{ for } k=1, 2, 3 \ldots \quad (11)$$

Equation (11) expresses the angular distance between sampling events as a function of the period between sampling events. To solve for the angular distances, circular closure and dynamic reversal techniques are applied to Equation (11).

Circle closure constrains the sum of the angular distances between sampling events to be exactly one revolution of the spindle. Thus, circle closure can be expressed by summing Equation (11) over a full revolution of the spindle from k=S+1 to k=S+N, where S is the start of the analyzed data set indexed into the spindle free response:

$$N\Delta_0 = \omega_0 \sum_{i=S+1}^{S+N} T_i + a \sum_{i=S+1}^{S+N} T_i i + b \sum_{i=S+1}^{S+N} T_i i^2 \quad (12)$$

$$\Rightarrow \omega_0 = \frac{N\Delta_0}{\sum_{i=S+1}^{S+N} T_i} - \frac{\sum_{i=S+1}^{S+N} T_i i}{\sum_{i=S+1}^{S+N} T_i} a - \frac{\sum_{i=S+1}^{S+N} T_i i^2}{\sum_{i=S+1}^{S+N} T_i} b$$

Replacing the initial speed $\omega_0$ in Equation (11) with Equation (12) results in:

$$\frac{N\Delta_0}{\sum T_i} T_k = \Delta_k + a\left(\frac{\sum T_i i}{\sum T_i} - k\right) T_k + b\left(\frac{\sum T_i i^2}{\sum T_i} - k^2\right) T_k \quad (13)$$

where $S+1 \leq k \leq S+N$, and $\Sigma$ represents the summing operation from i=S+1 to i=S+N. Equation (13) results in N equations that can be reordered according to $\Delta_k$ (from k=1 to N) and expressed in a vector format as:

$$m = \Delta + aU + bV \quad (14)$$

where $$m = \frac{N\Delta_0}{\Sigma T_i} \begin{bmatrix} T_{N+1} \\ \vdots \\ T_{N+S} \\ T_{S+1} \\ \vdots \\ T_N \end{bmatrix}; \quad U = \frac{\sum T_i i}{\sum T_i} \begin{bmatrix} T_{N+1} \\ \vdots \\ T_{N+S} \\ T_{S+1} \\ \vdots \\ T_N \end{bmatrix} - \begin{bmatrix} (N+1)T_{N+1} \\ \vdots \\ (N+S)T_{N+S} \\ (S+1)T_{S+1} \\ \vdots \\ NT_N \end{bmatrix};$$

$$\Delta = \begin{bmatrix} \Delta_1 \\ \vdots \\ \Delta_S \\ \Delta_{S+1} \\ \vdots \\ \Delta_N \end{bmatrix}; \quad V = \frac{\sum T_i i^2}{\sum T_i} \begin{bmatrix} T_{N+1} \\ \vdots \\ T_{N+S} \\ T_{S+1} \\ \vdots \\ T_N \end{bmatrix} - \begin{bmatrix} (N+1)^2 T_{N+1} \\ \vdots \\ (N+S)^2 T_{N+S} \\ (S+1)^2 T_{S+1} \\ \vdots \\ N^2 T_N \end{bmatrix}.$$

Equation (14) expresses a measurement result m as the sum of angular distance vector $\Delta$ and an artifact $aU+bV$ with unknown parameters a and b. As this artifact varies dynamically in time, which cannot be repeated and reversed, the classic reversal methods based on a static and reversible artifacts cannot be applied. Instead, Equation (14) can be solved using a dynamic reversal method.

Figure 3:
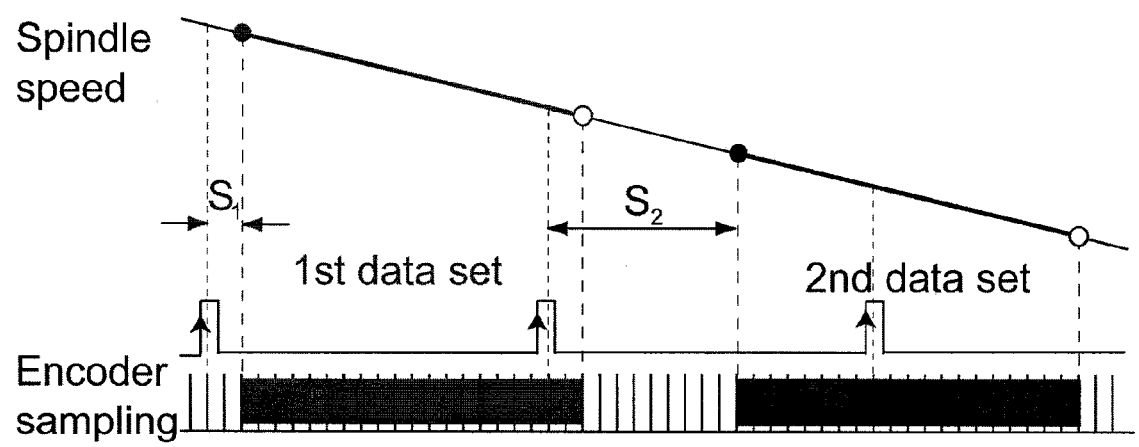
FIG. 3 is a graph of two data sets used for self-calibration of the rotary encoder calibration system shown in FIG. 1.

The dynamic reversal method employs a data set pair captured from the spindle free response operation; that is, the timing information generated by timer 15 during the spindle free response operation comprises a series of data set pairs. Referring to FIG. 3, each data set in the data set pair contains N consecutively recorded periods $T_k$ from the spindle free response operation with starts, $S_1$ and $S_2$ (indicated by solid circles) respectively, indexed into the spindle free response.

Applying Equation (14) to each data set of the data set pair results in the following two equations:

$$\begin{cases} m_1 = \Delta + a_1 U_1 + b_1 V_1 \\ m_2 = \Delta + a_2 U_2 + b_2 V_2 \end{cases} \quad (15)$$

where $m_1$, $U_1$, $V_1$, and $m_2$, $U_2$, $V_2$ are known vectors calculated from the two data sets of the data set pair.

The two equations of Equation (15) can be combined to cancel angular distance vector $\Delta$ to yield a linear equation for unknown parameters $a_1$, $b_1$ and $a_2$, $b_2$:

$$\underbrace{[U_1 \quad V_1 \quad -U_2 \quad -V_2]}_{M} \begin{bmatrix} a_1 \\ b_1 \\ a_2 \\ b_2 \end{bmatrix} = m_1 - m_2 \quad (16)$$

Figure 4:
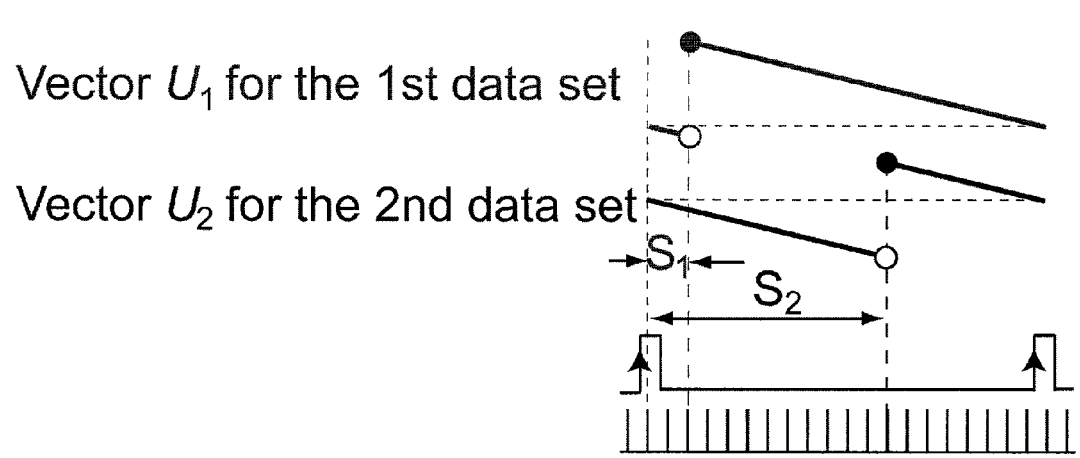
FIG. 4 is a graph of vectors $U_1$ and $U_2$ derived from the two data sets referred to in FIG. 3.

Although Equation (16) contains two unknown artifacts, both artifacts can be solved as long as vectors $U_1$, $V_1$, $U_2$, and $V_2$ are linearly uncorrelated. As vectors $V_1$ and $V_2$ are the second-order functions of spindle angular positions, $V_1$ and $V_2$ are naturally uncorrelated from $U_1$ and $U_2$. Referring to FIG. 4, vectors $U_1$ and $U_2$ are essentially the first-order functions of corresponding spindle angular positions with shifted starts. Uncorrelation of these vectors can be achieved by setting the two data set starts $S_1$ and $S_2$ sufficiently far apart from one other. Through experimentation it is has been found that $|S_1-S_2|$ should be set closer to N/2, as opposed to 0 or N, to ensure full column rank of matrix M. Preferably, the spacing $|S_1-S_2|$ is within a range from 10% of N to 90% of N. More preferably, the spacing $|S_1-S_2|$ is within a range from 25% of N to 75% of N. Most preferably, the spacing $|S_1-S_2|$ is equal to N/2.

First order damping coefficients $a_1$ and $a_2$ and second order damping coefficients $b_1$ and $b_2$ can be approximated by applying a least-square fit to Equation (16) as:

$$\begin{bmatrix} \overline{a_1} \\ \overline{b_1} \\ \overline{a_2} \\ \overline{b_2} \end{bmatrix} = (M^T M)^{-1} M^T [m_1 - m_2] \quad (17)$$

Combining Equation (17) with Equation (15), the angular distances between sampling intervals can be approximated as:

$$\overline{\Delta} = m_1 - \overline{a_1} U_1 - \overline{b_1} V_1 \text{ or } \overline{\Delta} = m_2 - \overline{a_2} U_2 - U_2 \overline{b_2} V_2 \quad (18)$$

Equation (18) provides an approximation of the angular distances based on the periods between the sampling intervals contained in a given data set pair. Based on these approximations the encoder error can be estimated by comparing the approximated angular distances $\Delta_k$ (from k=1 to N) to the nominal value $\Delta_0$. The encoder error can be represented in the form of an encoder error map by integrating Equation (18) with the DC component removed, expressed as:

$$\overline{E}_k(k) = \Sigma_{i=1}^{k}(\overline{\Delta}_i - \Delta_0) - \Sigma_{k=1}^{N}\Sigma_{i=1}^{k}(\overline{\Delta}_i - \Delta_0)/N \quad (19)$$

where $\overline{E}_k$ is the approximated encoder error at the kth sampling event.

As described in Equation (5), the dynamics of the spindle speed in a spindle free response have been modeled as having a constant damping component and a speed-dependent non-linear damping component. To determine the relative accuracy of this model at various angular speeds, a repeatability calculation is performed that compares the encoder error map resulting from solving the basic model for a plurality of data set pairs captured at different angular speeds of the spindle during the spindle free response. In particular, a plurality of data set pairs are selected from the spindle free response, wherein each data set pair is captured at a different angular speed of the spindle. For each data set pair, Equations (17), (18) and (19) are solved to provide an encoder error map. From the plurality of encoder error maps, a reference encoder error map is selected to be compared against the remainder of the encoder error maps in order to determine the repeatability of the basic model at various spindle speeds. The repeatability can be expressed as the root-mean-square difference between the encoder error maps and the reference encoder error map as:

$$R(n) = \|\overline{E}_k(n) - E_k^*\|_2 \quad (20)$$

where R is the repeatability of the basic model as a function of spindle speed, n is the spindle speed, $\overline{E}_k$ is the approximated encoder error map at a given spindle speed, and $E^*_k$ is the reference encoder error map.

From the repeatability function in Equation (20), spindle speeds that produce relatively uniform repeatability can be identified from spindle speeds that produce inconsistent repeatability. The spindle speeds that produce inconsistent repeatability are spindle speeds where the spindle exhibits significant nonlinear effects that are not accounted for in the model of the spindle dynamics described in Equation (5). Thus, the angular distances calculated for the spindle speeds with relatively uniform repeatability should be used.

Enhanced Model

The basic model described above utilizes two approximations: (a) the angular distances between sampling events are treated as evenly spaced by the nominal value $\Delta_0$ in Equation (9), and (b) the spindle speed at a sampling event is approximated as the average spindle speed between the sampling event and the preceding sampling event in Equation (10). These approximations may be used to carry out self-calibration of an encoder when the encoder error is unknown. However, at low speeds these approximations can introduce systematic errors into the calibration results. To account for these errors an enhanced model is provided that uses the solution of the basic model to iteratively refine the accuracy of the solution.

The approximation in Equation (9), of the angular distances between sampling events as evenly spaced by the nominal value $\Delta_0$, can be refined by using the angular distances $\overline{\Delta}_k$ solved in the previous calibration. In addition, the approximation in Equation (10), of the spindle speed at a sampling event as the average angular speed between the sampling event and the preceding sampling event, can be refined by using the instantaneous spindle speed at each sampling event derived based on the first order damping coefficient $\overline{a}$ solved in the previous calibration.

Figure 5:
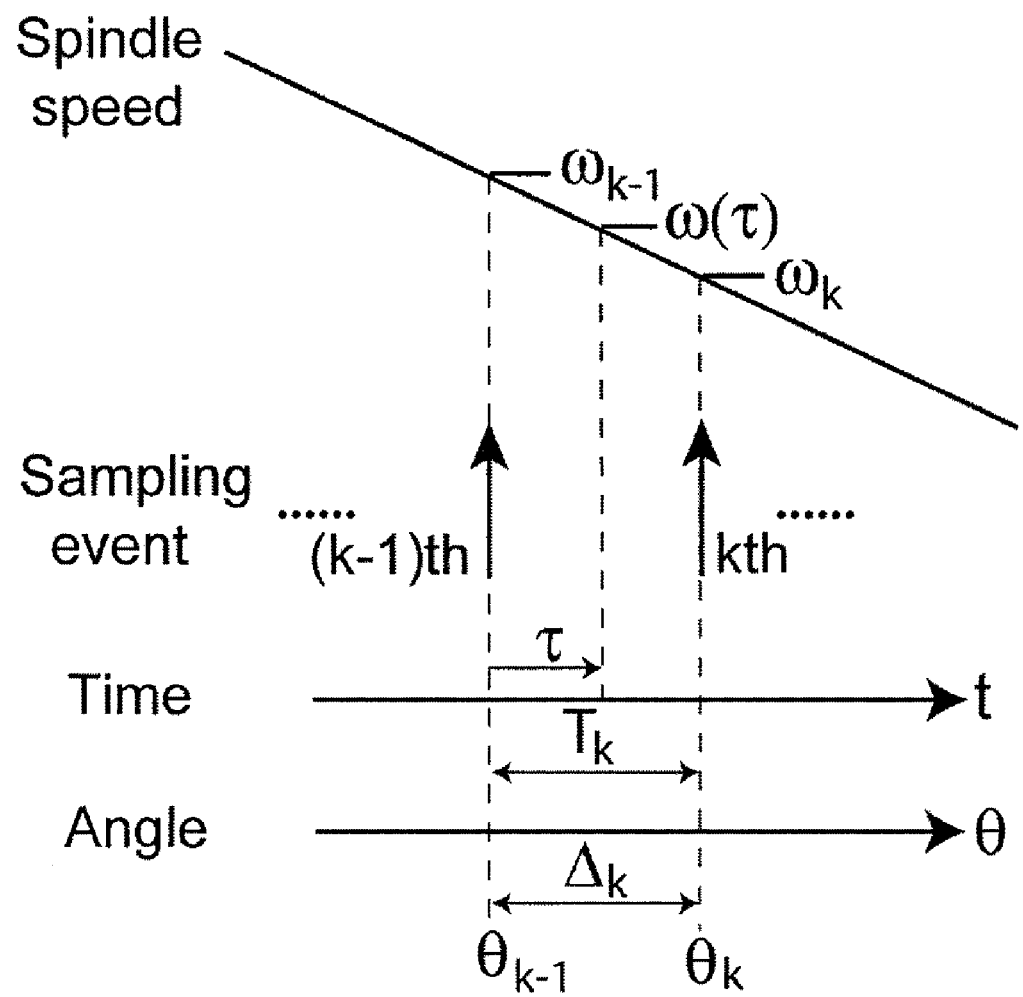
FIG. 5 is a graph of the average and instantaneous spindle speed of the rotary encoder calibration system shown in FIG. 1.

Referring to FIG. 5, the spindle speed at a time $\tau$ within between sampling event k−1 and k can be expressed as:

$$\omega(\tau) = \omega_k e^{c(T_k - \tau)} \quad (21)$$

where $c = -\overline{a}/\Delta_0$ is the first order damping coefficient estimated from the previous calibration. Integrating Equation (20) yields the angular distance between sampling intervals k and k−1 as a function of the period $T_k$ and the spindle speed $\omega_k$, expressed as $$\Delta_k = \int_0^{T_k} \omega(\tau) d\tau = \omega_k \frac{e^{cT_k} - 1}{c} \quad (22)$$

By reordering Equation (22), the instantaneous speed at sampling event k can be expressed as:

$$\omega_k = \Delta_k / T_k R_k, \text{ where } R_k = (e^{cT_k} - 1)/cT_k \quad (23)$$

Comparing Equation (23) to Equation (10), there is an additional correction term $R_k$, which is available only after applying the previous calibration method to determine damping coefficient c.

As discussed above, the angular distances $\overline{\Delta}_k$ solved in the previous calibration can be used to provide an improved estimation of angular position of the kth encoder sampling event, such that:

$$\theta_k - \theta_0 = \Sigma_{i=1}^{k} \overline{\Delta}_i \quad (24)$$

Combining Equation (24) with Equation (8) yields the spindle speed of the kth sampling event as a function of the angular distances $\Delta_k$ solved in the previous calibration, expressed as:

$$\omega_k = \omega_0 + aP_k + bP_k^2, \text{ where } P_k = \sum_{i=1}^{k} \frac{\overline{\Delta}_i}{\Delta_0} \quad (25)$$

Further, combining Equations (23) and (25) yields a refined model of the angular distances as a function of the angular distances $\overline{\Delta}_k$ and the first order damping coefficient $\overline{a}$ solved in the previous calibration, expressed as:

$$\Delta_k = T_k R_k [\omega_0 + aP_k + bP_k^2] \quad (26)$$

The angular distances between sampling events can be solved in the same manner as in the basic model by applying circular closure and dynamic reversal methods to Equation (26).

Circle closure constrains the sum of the angular distances between sampling events to be exactly one revolution of the spindle. Thus, circle closure can be expressed by summing Equation (26) over a full revolution of the spindle from k=S+1 to k=S+N, where S is the start of the analyzed data set indexed into the spindle free response:

$$N\Delta_0 = \omega_0 \sum_{j=S+1}^{S+N} T_j R_j + a \sum_{j=S+1}^{S+N} T_j R_j P_j + b \sum_{j=S+1}^{S+N} T_j R_j P_j^2 \quad (27)$$

$$\Rightarrow \omega_0 = \frac{N\Delta_0}{\sum_{j=S+1}^{S+N} T_j R_j} - \frac{\sum_{j=S+1}^{S+N} T_j R_j P_j}{\sum_{j=S+1}^{S+N} T_j R_j} a - \frac{\sum_{j=S+1}^{S+N} T_j R_j P_j^2}{\sum_{j=S+1}^{S+N} T_j R_j} b$$

Replacing the initial speed $\omega_0$ in Equation (26) with Equation (27) results in:

$$\frac{N\Delta_0}{\sum_{j=S+1}^{S+N} T_j R_j} T_k R_k = \qquad (28)$$

$$\Delta_k + a\left(\frac{\sum_{j=S+1}^{S+N} T_j R_j P_j}{\sum_{j=S+1}^{S+N} T_j R_j} - P_k\right) T_k R_k + b\left(\frac{\sum_{j=S+1}^{S+N} T_j R_j P_j^2}{\sum_{j=S+1}^{S+N} T_j R_j} - P_k^2\right) T_k R_k$$

where $S+1 \leq k \leq S+N$, and $\Sigma$ represents the summing operation from $i=S+1$ to $i=S+N$. Equation (28) results in N equations that can be reordered according to $\Delta_k$ (from $k=1$ to N) and expressed in a vector format as:

$$m_e = \Delta + aU_e + bV_e$$

where $$m_e = \frac{N\Delta_0}{\sum_{j=S+1}^{S+N} T_j R_j}\begin{bmatrix} T_{N+1}R_{N+1} \\ \vdots \\ T_{N+S}R_{N+S} \\ T_{S+1}R_{S+1} \\ \vdots \\ T_N R_N \end{bmatrix};$$

$$U_e = \frac{\sum_{j=S+1}^{S+N} T_j R_j P_j}{\sum_{j=S+1}^{S+N} T_j R_j}\begin{bmatrix} T_{N+1}R_{N+1} \\ \vdots \\ T_{N+S}R_{N+S} \\ T_{S+1}R_{S+1} \\ \vdots \\ T_N R_N \end{bmatrix} - \begin{bmatrix} P_{N+1}T_{N+1}R_{N+1} \\ \vdots \\ P_{N+S}T_{N+S}R_{N+S} \\ P_{S+1}T_{S+1}R_{S+1} \\ \vdots \\ P_N T_N R_N \end{bmatrix};$$

$$V_e = \frac{\sum_{j=S+1}^{S+N} T_j R_j P_j^2}{\sum_{j=S+1}^{S+N} T_j R_j}\begin{bmatrix} T_{N+1}R_{N+1} \\ \vdots \\ T_{N+S}R_{N+S} \\ T_{S+1}R_{S+1} \\ \vdots \\ T_N R_N \end{bmatrix} - \begin{bmatrix} P_{N+1}^2 T_{N+1}R_{N+1} \\ \vdots \\ P_{N+S}^2 T_{N+S}R_{N+S} \\ P_{S+1}^2 T_{S+1}R_{S+1} \\ \vdots \\ P_N^2 T_N R_N \end{bmatrix}$$

Equation (29) expresses a measurement result m as the sum of angular distance vector A and an artifact $aU_e+bV_e$ with unknown parameters a and b. As this artifact varies dynamically in time, which cannot be repeated and reversed, the classic reversal methods based on a static and reversible artifacts cannot be applied. Instead, Equation (29) can be solved using a dynamic reversal method.

Similar to the basic model, the dynamic reversal method employs a data set pair captured from the spindle free response. Each data set in the data set pair contains N consecutively recorded periods $T_k$ from the spindle free response with starts, $S_1$ and $S_2$ respectively, indexed into the spindle free response.

Applying Equation (29) to each data set of the data set pair results in the following two equations:

$$\begin{cases} m_{e1} = \Delta + a_1 U_{e1} + b_1 V_{e1} \\ m_{e2} = \Delta + a_2 U_{e2} + b_2 V_{e2} \end{cases} \qquad (30)$$

where $m_{e1}$, $U_{e1}$, $V_{e1}$, and $m_{e2}$, $U_{e2}$, $V_{e2}$ are known vectors calculated from the two data sets of the data set pair.

The two equations of Equation (30) can be combined to cancel angular distance vector A to yield a linear equation for unknown parameters $a_1$, $b_1$, and $a_2$, $b_2$:

$$\underbrace{[U_{e1} \quad V_{e1} \quad -U_{e2} \quad -V_{e2}]}_{M_e}\begin{bmatrix} a_1 \\ b_1 \\ a_2 \\ b_2 \end{bmatrix} = m_{e1} - m_{e2} \qquad (31)$$

Although Equation (31) contains two unknown artifacts, both artifacts can be solved as long as vectors $U_{e1}$, $V_{e1}$, $U_{e2}$, and $V_{e2}$ are linearly uncorrelated. As vectors $V_{e1}$ and $V_{e2}$ are the second-order functions of spindle angular positions, $V_{e1}$ and $V_{e2}$ are naturally uncorrelated from $U_{e1}$ and $U_{e2}$. Vectors $U_{e1}$ and $U_{e2}$ are essentially the first-order functions of corresponding spindle angular positions with shifted starts. Uncorrelation of these vectors can be achieved by setting the two data set starts $S_1$ and $S_2$ sufficiently far apart from one other. Through experimentation it is has been found that $|S_1-S_2|$ should be set close to $N/2$, as opposed to 0 or N, to ensure full column rank of matrix $M_e$.

First order damping coefficients $a_1$ and $a_2$ and second order damping coefficients $b_1$ and $b_2$ can be approximated by applying a least-square fit to Equation (31) as:

$$\begin{bmatrix} \bar{a}_1 \\ \bar{b}_1 \\ \bar{a}_2 \\ \bar{b}_2 \end{bmatrix} = (M_e^T M_e)^{-1} M_e^T [m_{e1} - m_{e2}]. \qquad (32)$$

Combining Equation (32) with Equation (30), the angular distances between sampling intervals can be approximated as:

$$\bar{\Delta} = m_{e1} - \bar{a}_1 U_{e1} - \bar{b}_1 V_{e1} \text{ or } \bar{\Delta} = m_{e2} - \bar{a}_2 U_{e2} - \bar{b}_2 V_{e2} \qquad (33)$$

Figure 6:
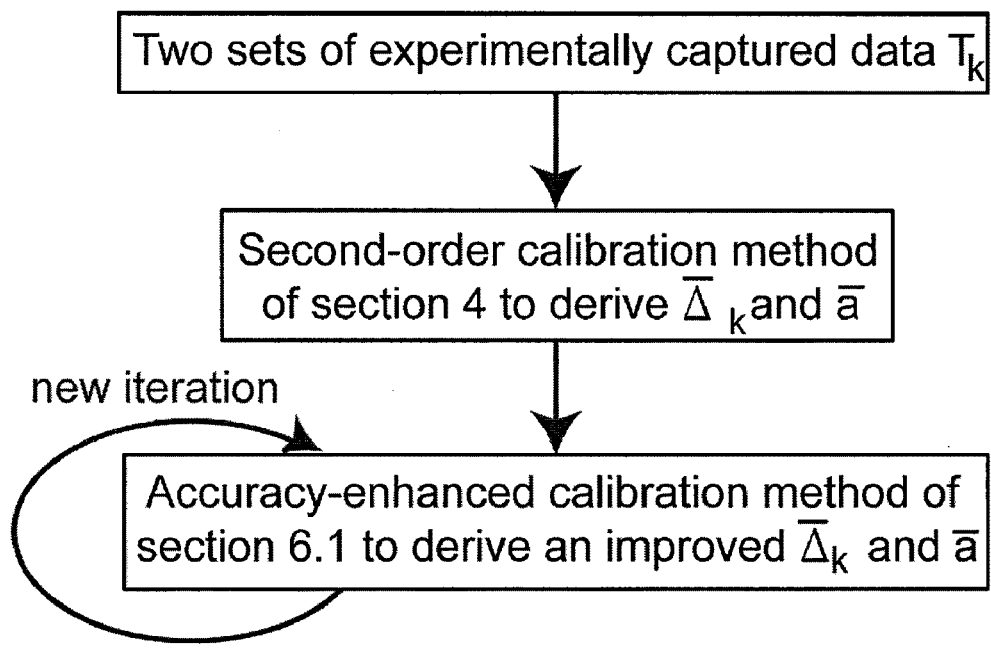
FIG. 6 is a process diagram of an enhanced method of self-calibration of the rotary encoder calibration system shown in FIG. 1.

Referring to FIG. 6, the enhanced model can be repeatedly solved by using the angular distances $\bar{\Delta}_k$ and the first order damping coefficient $\bar{a}$ solved in the previous calibration to further refine the estimate of the angular distances between sampling events and the instantaneous spindle speed at each sampling event. The iteration of the enhanced model continues until the variation between successive solved angular distances is below a convergence threshold.

Operation

In the present embodiment the rotary encoder calibration system 10 is external to the encoder 12 and the associated machinery for which the encoder 12 is associated. The processor 14 is a general purpose computer and the timer 15 is a field programmable gate array.

In operation, calibration of the encoder 12 begins by a user instructing the processor 14 to execute the calibration method stored on its memory. The processor 14 then controls the spindle motor to accelerate the rotor 20 and optical disk 24 to a selected first speed. When this speed is reached, the processor 14 instructs the spindle motor to decouple from the spindle and the spindle and optical disk 24 are left to decelerate freely to a selected second speed (spindle free response period).

During the spindle free response period, the timer 14 communicates with the detector 26 and receives from the detector 26 output signals representing a plurality of sampling events. Each sampling event represents a transition from one detectable element to another of the optical disk 24 as detected by the detector 26, wherein each sampling event is spaced an angular distance apart from the preceding sampling event. The timer 15 uses the output signals to measure the periods between sampling events during the spindle free response period until the encoder 12 decelerates to the selected second speed. The timer 15 then communicates this information to the processor 14.

The detector's output signals comprise a plurality of data set pairs taken during the spindle free response period. Each data set contains the periods between each sampling event occurring in one revolution of the encoder 12 at a particular angular speed, and each data set pair contains two uncorrelated data sets. The processor 14 selects at least some of these data set pairs and applies the methods described above to define a model of the angular distances between each sampling event occurring in one revolution of the encoder based on the periods between each sampling event as contained in a data set pair. The processor 14 then solves the basic model for the angular distances for each data set pair, calculates the repeatability of the angular distances solved for each data set pair, and then selects the angular distances solved for a data set pair based on the repeatability of the angular distances compared to the repeatability of the angular distances solved for other data set pairs. These angular distances form an encoder error map, which is provided to a controller in the machinery which communicates with the encoder 12 during normal operation of the machinery. The controller uses the encoder error map to correct each of the measurements taken by the encoder 12 during regular spindle operation to improve the encoder accuracy.

In addition, an enhanced version of the above calibration operation can be executed by the processor 14. In this enhanced calibration operation, additional steps are applied by the processor 14, namely: defining an enhanced model of the angular distances between each sampling event occurring in one revolution of the encoder based on the periods between each sampling event as contained in a data set pair and the solution of the previously solved basic model. Then, the processor 14 selects the angular distance solved for a data set pair using the previously solved basic model, and then repeatedly solves the enhanced model for the angular distances until the variation between successive solved angular distances is below a convergence threshold. The processor 14 then selects this last set of determined angular distances and creates an enhanced encoder error map which is provided to the controller to correct each of the measurements taken by the encoder 12 during regular spindle operation to improve the encoder accuracy.

Experimental Results

Basic Model

Figure 7:
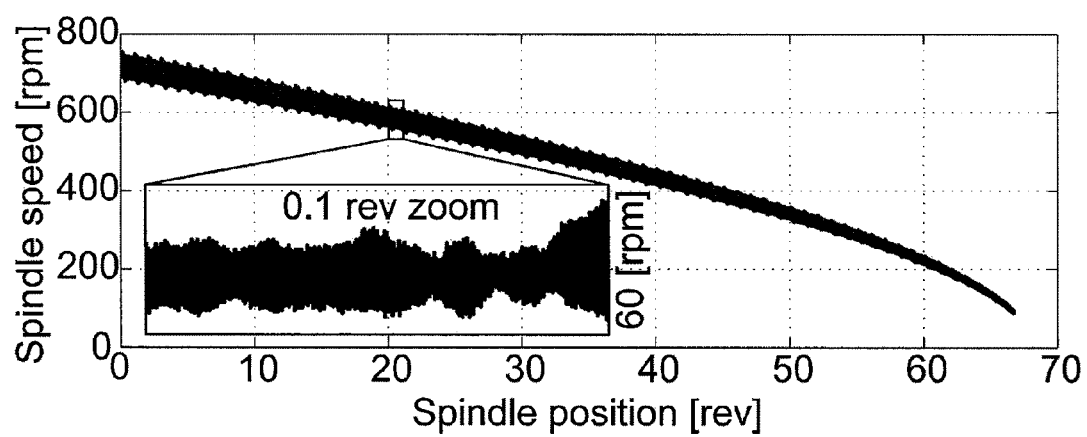
FIG. 7 is a graph of an experimental spindle free response of the rotary encoder calibration system shown in FIG. 1.

The basic model was applied to a motorized air-bearing spindle with an integrated rotary encoder. The rotary encoder was specified as having: 2500 graduation lines, 10000 counts/rev, system accuracy of +53 arc-sec, and graduation accuracy of ±5 arc-secs. The supplied air pressure to the spindle was 80 psi. A processor with a 100 MHz clock rate was used to capture the period between sampling events. The spindle was accelerated to a maximum angular speed of 800 rpm and the spindle free response was captured by the processor. FIG. 7 shows the experimentally captured spindle free response in which the apparent spindle speed is the ratio of the nominal value $\Delta_0$ and the period between sampling events $T_k$. The ripples in the spindle free response reflect the encoder error.

Figure 8:
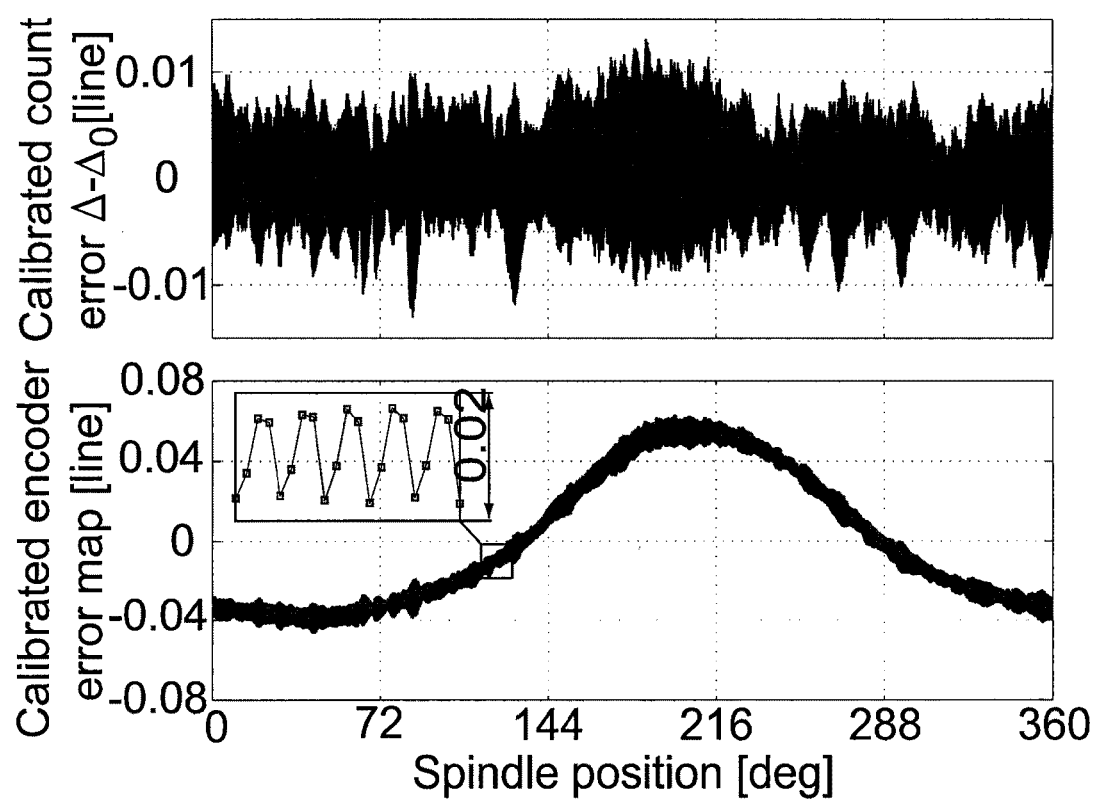
FIG. 8 is a graph of the calibration results from applying a basic model to the spindle free response shown in FIG. 7.

The basic model was applied to a reference data set pair near 700 rpm with data set starts at $S_1=0$ and $S_2=5000$. The approximate angular distances $\bar{\Delta}_k$ were solved and the encoder error map was calculated. FIG. 8 shows the calibration results versus the spindle position. The upper graph shows the encoder count error $\bar{\Delta}_k - \Delta_0$ and the lower graph shows the encoder error map $E_k^*$ calculated from $\bar{\Delta}_k$ according to Equation (19). In order to reflect the relative magnitude between encoder error and graduation line spacing the experimental results are plotted in units of graduation line width with one line equal to 1/2500 rev or 518 arc-sec for the experimental encoder. Based on the experimental results, the encoder error is ±0.06 line (±31 arc-secs), which is within the manufacturer's specified accuracy. As there are four counts in each graduation line, the calibration results contain both the graduation error and the sub-division error.

Figure 9:
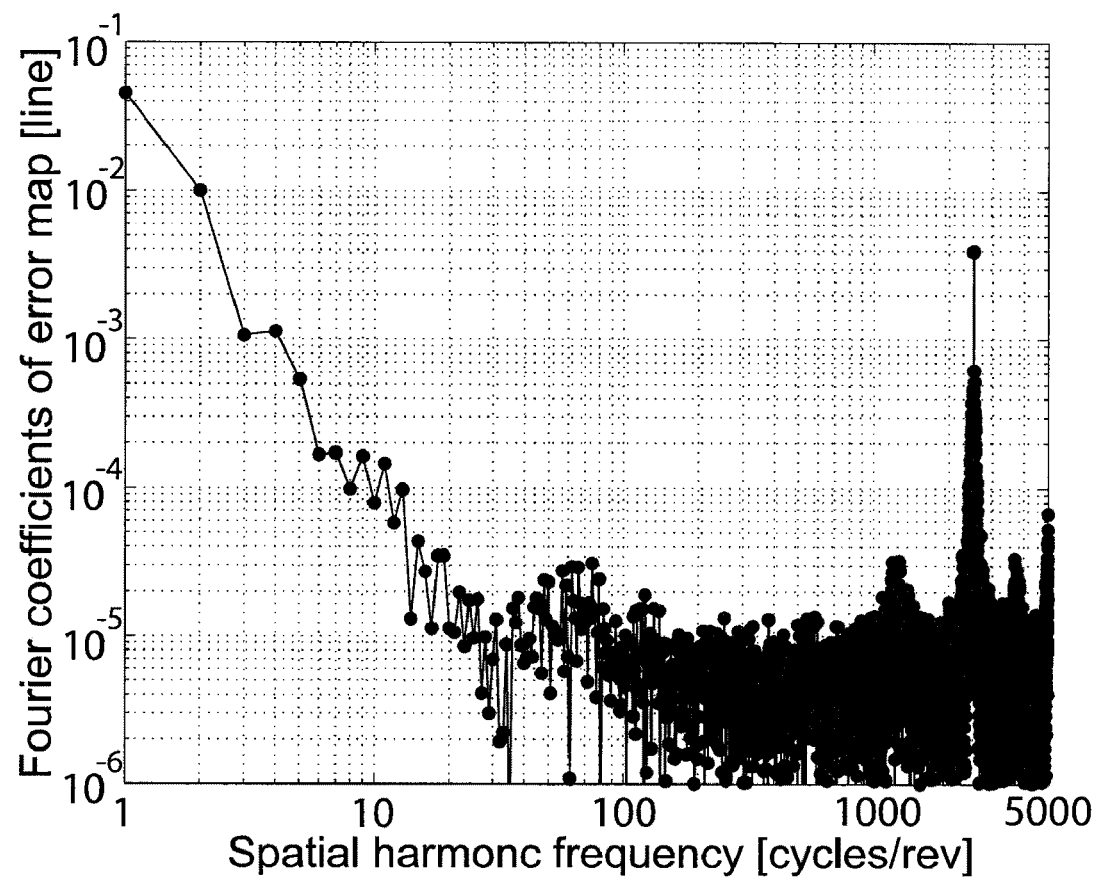
FIG. 9 is a graph of the Fourier coefficients of the calibration results shown in FIG. 8.

Referring to FIG. 9, the encoder error map of the reference data set pair is shown in the frequency domain. The graph shows the Fourier coefficients of the calibrated encoder error map $E_k^*$ having two distinctive peaks: 0.045 line at one cycle/rev and 0.004 line at 2500 cycle/rev. The former is mainly caused by the graduation eccentricity, and the latter may result from differences between the two detectors (alignment and signal processing in the encoder). From the estimated $\bar{a}$ and $\bar{b}$, the higher order error term $\omega_e$ in Equation (7) is calculated to be less than $10^{-4}$ rpm, and the encoder count calibration error resulting from ignoring $\omega_e$ is less than $10^{-7}$ line, which is negligible in comparison to the results shown in FIG. 8. Thus, this result confirms that the higher order term in Equation (7) can be neglected.

As discussed above, to solve Equation (16), the vectors $U_1$, $V_1$, $U_2$, and $V_2$ must be linearly uncorrelated. To determine the correlation between these vectors as a function of $|S_1-S_2|$, the basic model was solved for a plurality of data set pairs near 700 rpm with $S_1$ set at 0 and $S_2$ set varying from 0 to 10000. For each data set pair the encoder error map in Equation (19) was determined. The repeatability of the solution of the basic model as a function of the spatial separation of data sets in a data set pair was determined using the calibration encoder error map $E_k^*$ as a comparison reference. The repeatability can be expressed as the root-mean-square difference between the encoder error maps and the calibration encoder error map as:

$$R(S_2) = \|\bar{E}_k(S_1=0, S_2, n=700) - E_k^*\|_2 \tag{34}$$

Figure 10:
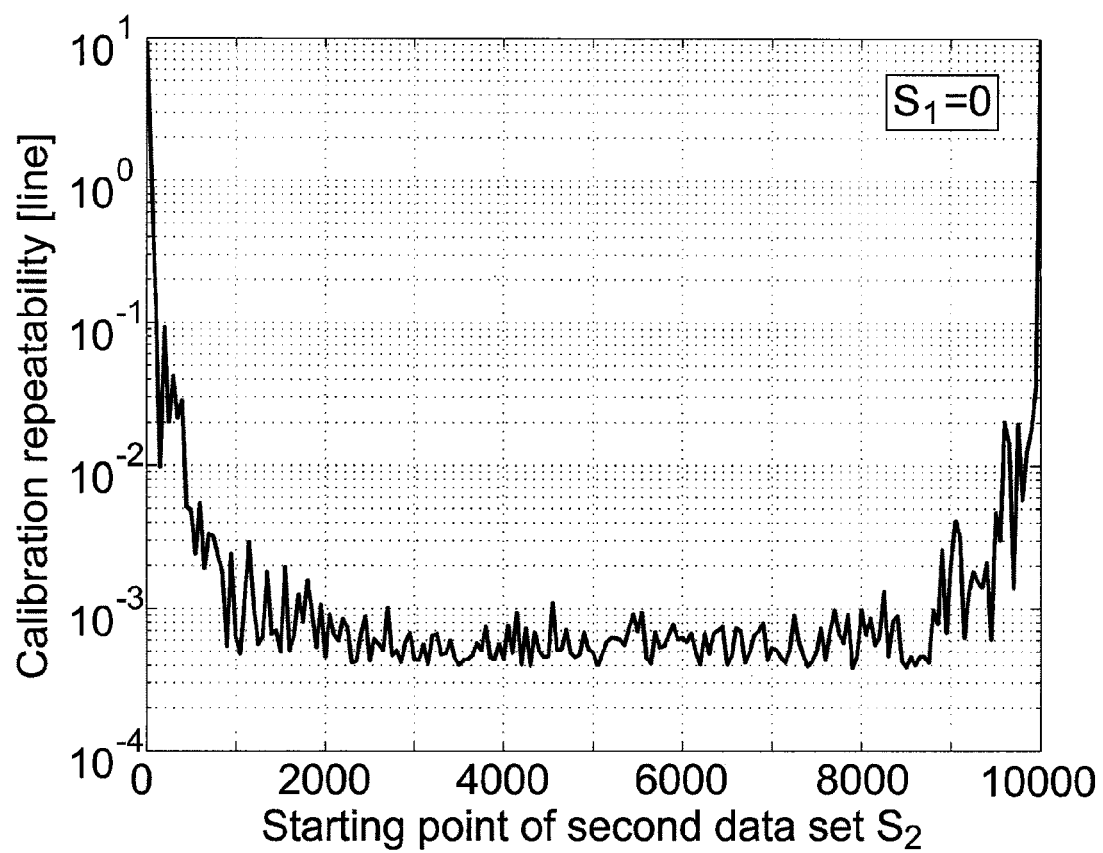
FIG. 10 is a graph of calibration repeatability versus the starting point of the second data set selected from the spindle free response shown in FIG. 7.

Referring to FIG. 10, the experimental results of the repeatability calculation in Equation (34) is shown. It can be seen that the repeatability on $S_2$ is less than $10^{-3}$ line (or 0.5 arc-sec) when $S_2$ is set between 2500 and 7500 lines. Therefore, a 90 to 270 degree phase difference between the starts of the data sets of a data set pair ensures sufficient non-correlation of the two data sets. Where the two starts coincide ($S_2=0$ or 10000), significant calibration error results because the matrix M in Equation (16) loses full column rank.

In addition, the calibration repeatability on $S_1$ with $S_2-S_1$ fixed at 5000 was determined by solving the basic model for the experimental data at 700 rpm. The repeatability on $S_1$ is expressed as:

$$R(S_1) = \|\bar{E}_k(S_1, S_2=S_2+5000, n=700) - E_k^*\|_2 \tag{35}$$

Figure 11:
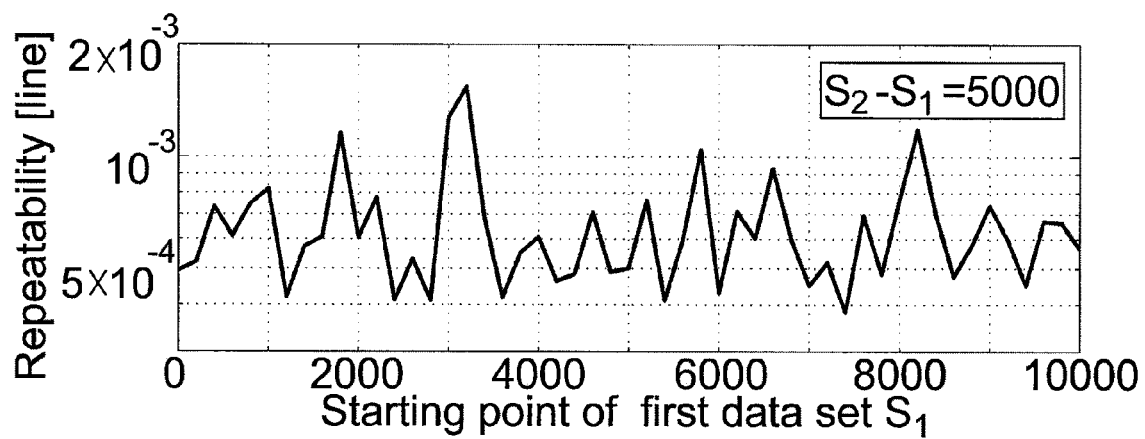
FIG. 11 is a graph of the of calibration repeatability versus the starting point of the first data set selected from the spindle free response shown in FIG. 7.

Referring to FIG. 11, the experimental results of the repeatability calculation in Equation (35) are shown. It can be seen that the repeatability forms a random pattern with less than 0.0015 line (or 0.8 arc-sec) regardless of $S_1$ selection. Therefore, these results confirm that the phase difference $|S_1-S_2|$ in the range of (0.25N, 0.75N) is sufficient to ensure full column rank of matrix M in Equation (16) and thus consistent calibration results.

Figure 12:
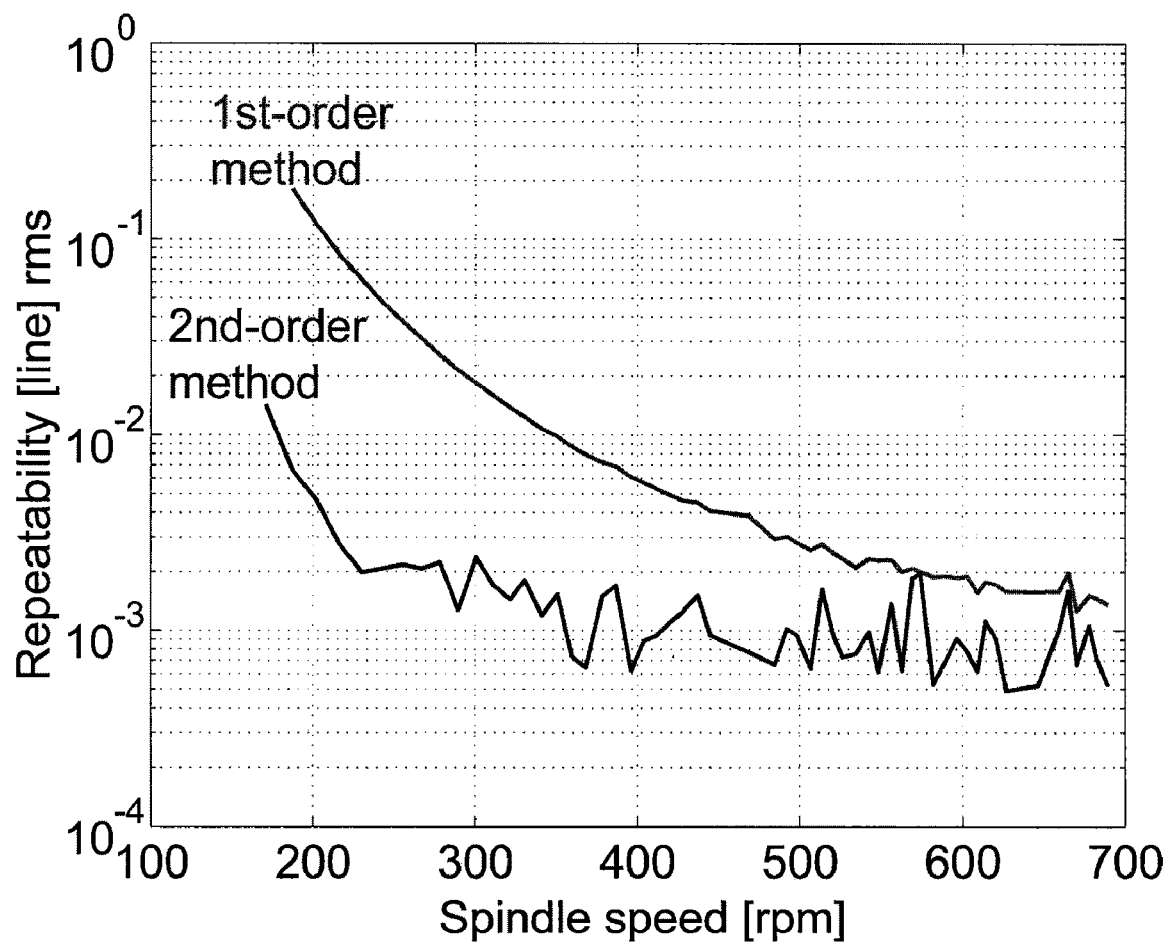
FIG. 12 is a graph of calibration repeatability versus the spindle speed using data set pairs selected from the spindle free response shown in FIG. 7.

The basic model was also solved for various spindle speeds of the experimental data, with data set starts at $S_1=0$ and $S_2=5000$. The repeatability based on spindle speed was calculated using Equation (20). Referring to FIG. 12, the results of the repeatability calculations are shown. It can be seen that for spindle speeds in the range of 300 rpm to 700 rpm, the repeatability has a nearly random flat pattern that is less than 0.002 line (or 1 arc-sec). At spindle speeds less than 300 rpm, the repeatability degrades significantly due to nonlinear damping effects that are not accommodated by Equation (5). Based on these results the angular distances solved by applying the basic model to data set pairs derived from spindle speeds of 300~700 rpm should be used. It should be noted that the applicability of these angular distances is not limited to the speed at which the encoder was calibrated.

This repeatability of 0.002 line is believed to be limited by the non-repeatable error of the encoder used in the experiment. Through calibration, the encoder accuracy is enhanced from ±0.06 line to 0.002 line root-mean-square. Referring to FIG. 12, the repeatability of the basic model is compared to the repeatability of the first-order calibration method described in Lu, X.-D., Trumper, D. L., 2006, Self-Calibration of Air-Bearing Encoders, Proc. of ASPE Annual Meeting, which is based on a constant damping assumption. By comparison, the basic model greatly improves the encoder calibration repeatability by introducing a speed-dependent damping term $c_1$ in Equation (5) to accommodate nonlinear effects in spindle damping.

Figure 13:
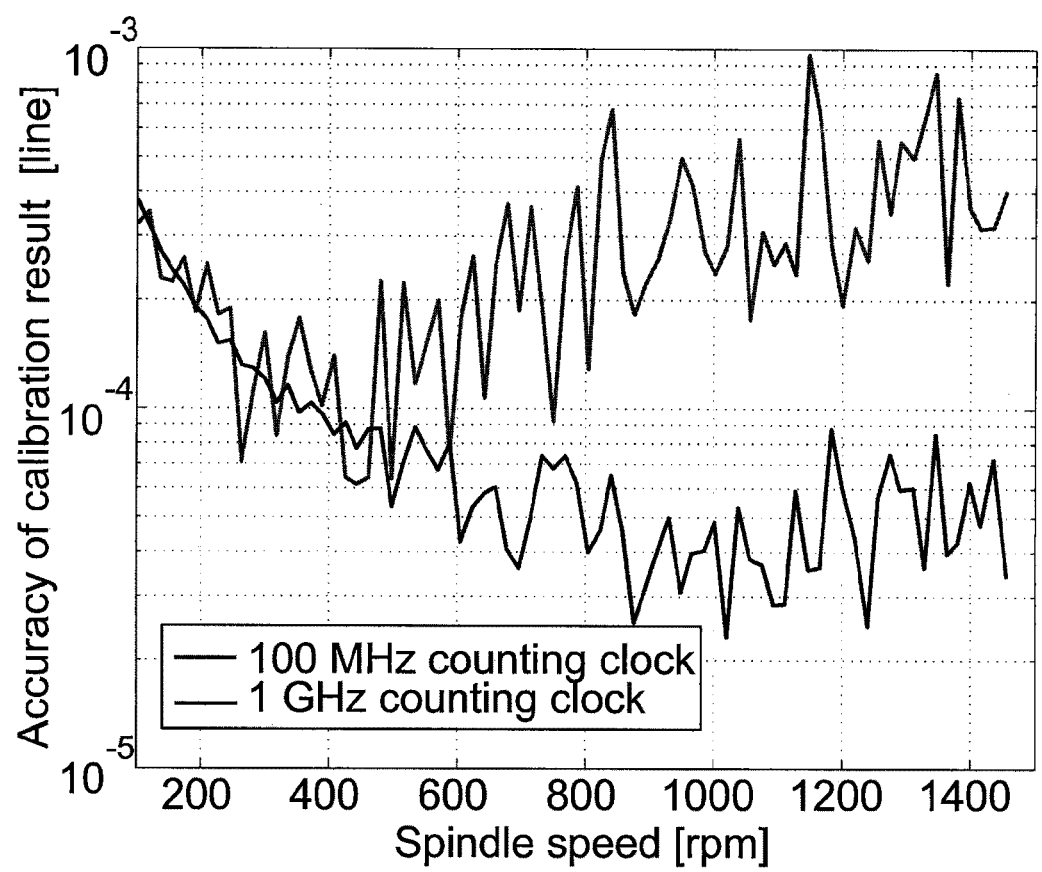
FIG. 13 is a graph of the of the calibration accuracy of the basic model for clock frequencies of 100 MHz an 1 GHz as applied to the spindle free response shown in FIG. 7.

The accuracy of the basic model was also determined using a simulation experiment to investigate systematic errors. First, a spindle free response was generated with constant normalized damping of 6 rpm/rev and initial speed of 1500 rpm. Next, a 10000-count encoder with error $E_k^*$ derived from the above experimental results was used to measure the simulated spindle position. The simulated encoder output signals were captured at two different clock rates: 100 MHz and 1 GHz. The basic model was then solved with $S_1=0$ and $S_2=5000$ to derive the encoder error map. The calibration accuracy of the basic model was calculated as the root-mean-square difference between the calibrated error map and the actual encoder error $E_k^*$. Referring to FIG. 13, the calibration accuracy of the basic model is shown for captured output signals using both 100 MHz and 1 GHz clock rates. It can be seen that at spindle speeds higher than 800 rpm, the calibration accuracy using a 1 GHz clock is 10 times better than that using a 100 MHz clock. However, at speeds lower than 400 rpm, both calibration accuracies converge and degrade as the spindle speed decreases.

Enhanced Model

The accuracy of the enhanced model was determined by solving the enhanced model using the results of the simulation experiment for the basic model described above. The enhanced model was solved for four iterations, the results of which can be seen in FIG. 14. As can be seen by comparing FIG. 13 to FIG. 14, the enhanced model significantly improves the calibration accuracy, especially at spindle speeds lower than 800 rpm. At 200 rpm, the calibration accuracy using a 100 MHz clock is $10^{-4}$ line or 0.05 arc-sec. This accuracy is limited by the temporal quantization in measuring the periods between sampling events and the counting error. The counting error is approximately one clock period or $1/f_c$ sec for a clock speed of $f_c$ Hz. This corresponds to an error in the angular distance of:

$$E(n)=n/60f_c [rev] \qquad (36)$$

where E is the error as a function of spindle speed n and clock speed $f_c$.

Figure 14:
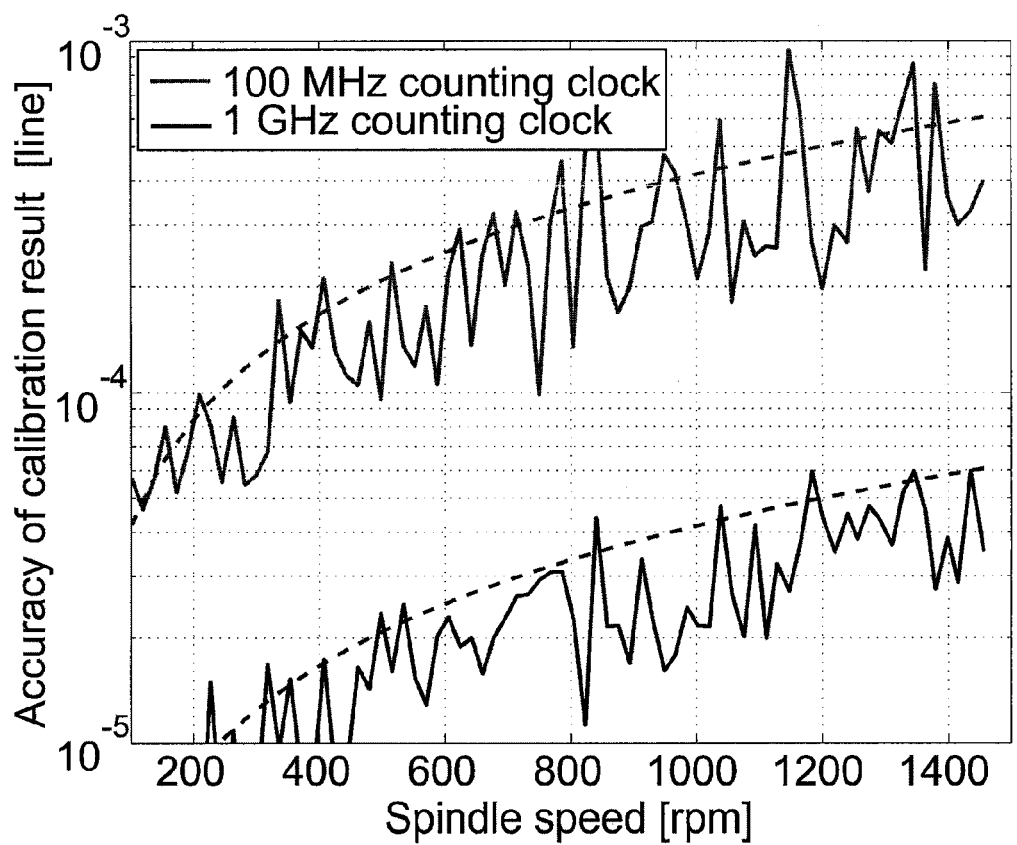
FIG. 14 is a graph of the of the calibration accuracy of the enhanced model for clock frequencies of 100 MHz an 1 GHz as applied to the spindle free response shown in FIG. 7.

Referring to FIG. 14, the error in Equation (36) is plotted with two dashed lines corresponding to clock speeds of 100 MHz and 1 GHz. The coincidence of this error with the plots of the accuracies of the enhanced model at 100 MHz and 1 GHz indicates that Equation (36) is a satisfactory estimate of the calibration accuracy limited by the counting error.

Further, the simulations for the basic model and the enhanced model were repeated using a nonlinear damping: $c_0=6$ rpm/rev and $c_1=-0.01/$rev as defined in Equation (4). The results of theses simulations were similar to FIGS. 13 and 14. Thus, there is no systematic error associated with the enhanced model when applied to spindles with constant damping or first-order nonlinear damping.

The invention claimed is:

1. A method of calibrating a rotary encoder comprising a detectable portion having a plurality of detectable elements about a rotational axis of the encoder and a detector operable to detect the detectable elements and generate an output signal in response to movement of the detectable portion about the rotational axis of the encoder, the method comprising the steps of:
   (a) rotating the encoder to a selected first speed then allowing the encoder to freely decelerate to a selected second speed over a spindle-free response period;
   (b) during the spindle-free response period, receiving output signals from the detector, the signals including a plurality of data sets wherein each data set comprises the periods between sampling events occurring in one revolution of the encoder at an angular speed, each sampling event representing a transition between successive detectable elements of the encoder and each sampling event being spaced an angular distance apart from the preceding sampling event;
   (c) selecting a data set pair from the output signals, wherein the data set pair contains two linearly uncorrelated data sets;
   (d) defining a model of the angular distances between each sampling event occurring in one revolution of the encoder as a function of one or more damping coefficients and the periods between each sampling event as contained in the data set pair;
   (e) solving the model for the angular distances for the data set pair using circular closure and dynamic reversal techniques; and
   (f) establishing an encoder error map using the selected solved angular distances from the model.

2. A method as claimed in claim 1, wherein in the model, an angular distance $\Delta_k$ between sampling events k and k-1 as defined by:

$$\Delta_k=T_k(\omega_0+ak+bk^2)$$

wherein
   $\omega_0$ is the initial angular speed,
   $T_k$ is the period between sampling events k and k-1,
   a is a first order damping coefficient, and
   b is a second order damping coefficient, and $\omega_0$ is the initial spindle speed,
is solved by circular closure and dynamic reversal techniques.

3. A method as claimed in claim 2, wherein the circle closure technique is applied to constrain the sum of the angular distances between sampling events to one revolution of the encoder, resulting in vector equation:

$$m=\Delta+aU+bV$$

which expresses a measurement result m as the sum of angular distance vector $\Delta$ and an artifact aU+bV.

4. A method as claimed in claim 3, wherein artifact aU+bV is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

5. A method as claimed in claim 4, wherein vectors $U_1$, $V_1$, $U_2$, and $V_2$ are linearly uncorrelated.

6. A method as claimed in to claim 5, wherein the vectors $U_1$, $V_2$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

7. A method as claimed in to claim 6, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

8. A method as claimed in to claim 7, wherein the vectors $U_1$, $V_1$, $U_2$, and $V_2$ are uncorrelated by setting the data sets in each data set pair to be out of phase with one another by half of the total number of sampling events occurring in one revolution of the encoder.

9. A method as claimed in claim 8, wherein the vector pair equations are combined to cancel angular distance vector $\Delta$ and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

10. A method as claimed in claim 9, wherein the approximated damping coefficients $a_1$, $b_1$, $a_2$, $b_2$ are applied to the vector pair equations to provide an equation for determining angular distance between sampling intervals as:

$$\overline{\Delta}=m_1-\overline{a_1}U_1-\overline{b_1}V_1 \text{ or } \overline{\Delta}=m_2-\overline{a_2}U_2-\overline{b_2}V_2.$$

11. A method as claimed in claim 1, wherein:
in step (c), a plurality of data set pairs are selected from the output signals;
in step (e), the model is solved for the angular distances for each of the plurality of data set pairs;
step (f) comprises the following steps:
(i) calculating the repeatability of the angular distances solved for each of the plurality of data set pairs;
(ii) selecting the angular distances solved for one of the plurality of data set pairs based on the repeatability of the angular distances as compared to the repeatability of the angular distances solved for other data set pairs;
(iii) establishing an encoder error map using the selected solved angular distances from the model.

12. A method according to claim 1, wherein step (f) comprises the following steps:
(i) defining an enhanced model of the angular distances between each sampling event occurring in one revolution of the encoder as a function of one or more damping coefficients, the solution of a previously solved model, and the periods between each sampling event as contained in each data set pair;
(ii) selecting the angular distances solved for a data set pair using the previously solved model;
(iii) repeatedly solving the enhanced model for the angular distances using circular closure and dynamic reversal techniques until the variation between successive solved angular distances is below a convergence threshold; and
(iv) establishing an encoder error map using the selected solved angular distances from the enhanced model.

13. A method as claimed in claim 12, wherein in the enhanced model, an angular distance $\Delta_k$ between sampling events k and k-1 as defined by:

$$\Delta_k=T_k R_k[\omega_0+aP_k+bP_k^2]$$

wherein
$\omega_0$ is the initial angular speed,
$T_k$ is the period between sampling events k and k-1,
$R_k$ is a correction term defined by $R_k=(e^{cT_k}-1)/cT_k$
c is defined by $c=-\overline{a}/\Delta_0$
$\overline{a}$ is an approximation of the first order damping coefficient previously solved using the model
$\Delta_0$ is the nominal angular distance between sampling events,
a is a first order damping coefficient,
b is a second order damping coefficient, and $\omega_0$ is the initial spindle speed,
P is defined by $$P_k = \sum_{i=1}^{k} \frac{\overline{\Delta}_i}{\Delta_0}, \text{ and}$$

$\overline{\Delta}_i$ is an approximation of angular distance $\Delta_k$ between sampling events k and k-1 from the previously solved model,
is solved by circular closure and dynamic reversal techniques.

14. A method as claimed in claim 13, wherein the circle closure technique is applied to constrain the sum of the angular distances between sampling events to one revolution of the encoder, resulting in vector equation:

$$m=\Delta+aU+bV$$

which expresses a measurement result m as the sum of angular distance vector $\Delta$ and an artifact aU+bV.

15. A method as claimed in claim 14, wherein artifact aU+bV is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

16. A method as claimed in claim 15, wherein vectors $U_1$, $V_1$, $U_2$, and $V_2$ are linearly uncorrelated.

17. A method as claimed in to claim 16, wherein the vectors $U_1$, $V_1$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

18. A method as claimed in to claim 17, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

19. A method as claimed in to claim 18, wherein the vectors $U_1$, $V_1$, $U_2$, and $V_2$ are uncorrelated by setting the data sets in each data set pair to be out of phase with one another by half of the total number of sampling events occurring in one revolution of the encoder.

20. A method as claimed in claim 19, wherein the vector pair equations are combined to cancel angular distance vector $\Delta$ and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

21. A method as claimed in claim 20, wherein the approximated damping coefficients $a_1$, $b_1$, $a_2$, $b_2$ are applied to the vector pair equations to provide an equation for determining angular distance between sampling intervals as:

$$\overline{\Delta}=m_1-\overline{a_1}U_1-\overline{b_1}V_1 \text{ or } \overline{\Delta}=m_2-\overline{a_2}U_2-\overline{b_2}V_2.$$

22. A system for calibrating a rotary encoder comprising a detectable portion having a plurality of detectable elements about a rotational axis of the encoder and a detector operable to detect the detectable elements and generate an output signal in response to movement of the detectable portion about the rotational axis of the encoder, the system comprising:

(a) a timer operable to receive output signals from the detector during a spindle-free response period, wherein the output signals comprise a plurality of data sets, each data set comprises the periods between sampling events occurring in one revolution of the encoder at an angular speed, each sampling event representing a transition between successive detectable elements of the encoder and each sampling event being spaced an angular distance apart from the preceding sampling event;

(b) a processor operable to receive the plurality of data sets from the timer, the processor having a memory with statements and instructions stored therein for execution by the processor of the following steps:

(i) controlling a motor to rotate the encoder to a selected first speed then to allow the encoder to freely decelerate to a selected second speed over the spindle free response period;

(ii) selecting a data set pair from the plurality of data sets, wherein the data set pair contains two linearly uncorrelated data sets;

(iii) defining a model of the angular distances between each sampling event occurring in one revolution of the encoder as a function of one or more damping coefficients and the periods between each sampling event as contained in the data set pair;

(iv) solving the model for the angular distances for the data set pair using circular closure and dynamic reversal techniques; and (v) establishing an encoder error map using the selected solved angular distances from the model.

23. A system as claimed in claim 22, wherein in the model, an angular distance $\Delta k$ between sampling events k and k−1 as defined by:

$$\Delta_k = T_k(\omega_0 + ak + bk^2)$$

wherein $\omega_0$ is the initial angular speed, $T_k$ is the period between sampling events k and k−1, a is a first order damping coefficient, and b is a second order damping coefficient, and $\omega_0$ is the initial spindle speed, is solved by circular closure and dynamic reversal techniques.

24. A system as claimed in claim 23, wherein the circle closure technique is applied to constrain the sum of the angular distances between sampling events to one revolution of the encoder, resulting in vector equation:

$$m=\Delta+aU+bV$$

which expresses a measurement result m as the sum of angular distance vector $\Delta$ and an artifact $aU+bV$.

25. A system as claimed in claim 24, wherein artifact $aU+bV$ is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

26. A system as claimed in claim 25, wherein vectors $U_1$, $V_1$, $U_2$, and $V_2$ are linearly uncorrelated.

27. A system as claimed in to claim 26, wherein the vectors $U_1$, $V_2$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

28. A system as claimed in to claim 27, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

29. A system as claimed in to claim 28, wherein the vectors $U_1$, $V_1$, $U_2$, and $V_2$ are uncorrelated by setting the data sets in each data set pair to be out of phase with one another by half of the total number of sampling events occurring in one revolution of the encoder.

30. A system as claimed in claim 29, wherein the vector pair equations are combined to cancel angular distance vector $\Delta$ and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

31. A system as claimed in claim 30, wherein the approximated damping coefficients $a_1$, $b_1$, $a_2$, $b_2$ are applied to the vector pair equations to provide an equation for determining angular distance between sampling intervals as:

$$\overline{\Delta} = m_1 - \overline{a_1}U_1 - \overline{b_1}V_1 \text{ or } \overline{\Delta} = m_2 - \overline{a_2}U_2 - \overline{b_2}V_2.$$

32. A system as claimed in claim 22, wherein:
in step (ii), a plurality of data set pairs are selected from the output signals;
in step (iv), the model is solved for the angular distances for each of the plurality of data set pairs;
step (v) comprises the following steps:
  (i) calculating the repeatability of the angular distances solved for each of the plurality of data set pairs;
  (ii) selecting the angular distances solved for one of the plurality of data set pairs based on the repeatability of the angular distances as compared to the repeatability of the angular distances solved for other data set pairs;
  (iii) establishing an encoder error map using the selected solved angular distances from the model.

33. A system as claimed in claim 22, wherein the processor is a general purpose computer.

34. A system as claimed in claim 22, wherein the timer is a field programmable gate array.

35. A system as claimed in claim 22, wherein the processor is a controller for controlling machinery having the encoder therein.

36. A system as claimed in claim 22, wherein the timer is a controller for controlling machinery having the encoder therein.

37. A system according to claim 22, wherein the memory has further statements and instructions stored therein for execution by the processor such that step (v) comprises the following steps:
  (1) defining an enhanced model of the angular distances between each sampling event occurring in one revolution of the encoder as a function of one or more damping coefficients, the solution of a previously solved model, and the periods between each sampling event as contained in each data set pair;
  (2) selecting the angular distances solved for a data set pair using the previously solved model;
  (3) repeatedly solving the enhanced model for the angular distances using circular closure and dynamic reversal techniques until the variation between successive solved angular distances is below a convergence threshold; and
  (4) establishing an encoder error map using the selected solved angular distances from the enhanced model.

38. A system as claimed in claim 37, wherein in the enhanced model, an angular distance $\Delta_k$ between sampling events k and k−1 as defined by:

$$\Delta_k = T_k R_k [\omega_0 + aP_k + bP_k^2]$$

wherein
$\omega_0$ is the initial angular speed,
$T_k$ is the period between sampling events k and k−1,
$R_k$ is a correction term defined by $R_k = (e^{cT_k} - 1)/cT_k$
c is defined by $c = -\overline{a}/\Delta_0$
$\overline{a}$ is an approximation of the first order damping coefficient previously solved using the model
$\Delta_0$ is the nominal angular distance between sampling events,
a is a first order damping coefficient,
b is a second order damping coefficient, and $\omega_0$ is the initial spindle speed,
P is defined by $$P_k = \sum_{i=1}^{k} \frac{\overline{\Delta}_i}{\Delta_0}, \text{ and}$$

$\overline{\Delta}_i$ is an approximation of angular distance $\Delta_k$ between sampling events k and k−1 from the previously solved model,
is solved by circular closure and dynamic reversal techniques.

39. A system as claimed in claim 38, wherein the circle closure technique is applied to constrain the sum of the angular distances between sampling events to one revolution of the encoder, resulting in vector equation:

$$m = \Delta + aU + bV$$

which expresses a measurement result m as the sum of angular distance vector $\Delta$ and an artifact $aU + bV$.

40. A system as claimed in claim 39, wherein artifact $aU + bV$ is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

41. A system as claimed in claim 40, wherein vectors $U_1$, $V_1$, $U_2$, and $V_2$ are linearly uncorrelated.

42. A system as claimed in to claim 41, wherein the vectors $U_1$, $V_1$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

43. A system as claimed in to claim 42, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

44. A system as claimed in to claim 43, wherein the vectors $U_1$, $V_1$, $U_2$, and $V_2$ are uncorrelated by setting the data sets in each data set pair to be out of phase with one another by half of the total number of sampling events occurring in one revolution of the encoder.

45. A system as claimed in claim 44, wherein the vector pair equations are combined to cancel angular distance vector $\Delta$ and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

46. A system as claimed in claim 45, wherein the approximated damping coefficients $a_1$, $b_2$, $a_2$, $b_2$ are applied to the vector pair equations to provide an equation for determining angular distance between sampling intervals as:

$$\overline{\Delta} = m_1 - \overline{a_1}U_1 - \overline{b_1}V_1 \text{ or } \overline{\Delta} = m_2 - \overline{a_2}U_2 - \overline{b_2}V_2.$$

47. A calibrated rotary encoder system comprising
(a) a rotary encoder comprising:
   (i) a detectable portion having a plurality of detectable elements about the rotational axis of the encoder;
   (ii) a detector operable to detect the detectable elements and generate an output signal in response to movement of the detectable portion about the rotational axis of the encoder;
(b) a controller communicative with the encoder and having a memory with an encoder error map stored thereon and statements and instructions for execution by the controller to apply the encoder error map to output signals received from the encoder to produce calibrated output signals; the encoder error map derived by:
   (i) rotating the encoder to a selected first speed then allowing the encoder to freely decelerate to a selected second speed over a spindle-free response period;
   (ii) during the spindle-free response period, receiving output signals from the detector, the signals including a plurality of data sets wherein each data set comprises the periods between sampling events occurring in one revolution of the encoder at an angular speed, each sampling event representing a transition between successive detectable elements of the encoder and each sampling event being spaced an angular distance apart from the preceding sampling event;
   (iii) selecting a data set pair from the output signals, wherein the data set pair contains two linearly uncorrelated data sets;
   (iv) defining a model of the angular distances between each sampling event occurring in one revolution of the encoder as a function of one or more damping coefficients and the periods between each sampling event as contained in the data set pair;
   (v) solving the model for the angular distances for the data set pair using circular closure and dynamic reversal techniques; and
   (vi) establishing the encoder error map using the selected solved angular distances from the model.

48. A system as claimed in claim 47, wherein in the model, an angular distance $\Delta_k$ between sampling events k and k−1 as defined by:

$$\Delta_k = T_k(\omega_0 + ak + bk^2)$$

wherein
   $\omega_0$ is the initial angular speed,
   $T_k$ is the period between sampling events k and k−1,
   a is a first order damping coefficient, and
   b is a second order damping coefficient, and $\omega_0$ is the initial spindle speed,
is solved by circular closure and dynamic reversal techniques.

49. A system as claimed in claim 48, wherein the circle closure technique is applied to constrain the sum of the angular distances between sampling events to one revolution of the encoder, resulting in vector equation:

$$m = \Delta + aU + bV$$

which expresses a measurement result m as the sum of angular distance vector $\Delta$ and an artifact $aU+bV$.

50. A system as claimed in claim 49, wherein artifact $aU+bV$ is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

51. A system as claimed in claim 50, wherein vectors $U_1$, $V_1$, $U_2$, and $V_2$ are linearly uncorrelated.

52. A system as claimed in to claim 51, wherein the vectors $U_1$, $V_1$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

53. A system as claimed in to claim 52, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

54. A system as claimed in to claim 53, wherein the vectors $U_1$, $V_1$, $U_2$, and $V_2$ are uncorrelated by setting the data sets in each data set pair to be out of phase with one another by half of the total number of sampling events occurring in one revolution of the encoder.

55. A system as claimed in claim 54, wherein the vector pair equations are combined to cancel angular distance vector $\Delta$ and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

56. A system as claimed in claim 55, wherein the approximated damping coefficients $a_1$, $b_1$, $a_2$, $b_2$ are applied to the vector pair equations to provide an equation for determining angular distance between sampling intervals as:

$$\overline{\Delta} = m_1 - \overline{a_1}U_1 - \overline{b_1}V_1 \text{ or } \overline{\Delta} = m_2 - \overline{a_2}U_2 - \overline{b_2}V_2.$$

57. A system as claimed in claim 47, wherein in deriving the encoder error map:
   in step (iii), a plurality of data set pairs are selected from the output signals;
   in step (v), the model is solved for the angular distances for each of the plurality of data set pairs;
   step (vi) comprises the following steps:
   (i) calculating the repeatability of the angular distances solved for each of the plurality of data set pairs;
   (ii) selecting the angular distances solved for one of the plurality of data set pairs based on the repeatability of the angular distances as compared to the repeatability of the angular distances solved for other data set pairs;
   (iii) establishing an encoder error map using the selected solved angular distances from the model.

58. A system according to claim 47, wherein step (vi) of deriving the encoder error map comprises:
   (1) defining an enhanced model of the angular distances between each sampling event occurring in one revolution of the encoder as a function of one or more damping coefficients, the solution of a previously solved model, and the periods between each sampling event as contained in each data set pair;

(2) selecting the angular distances solved for a data set pair using the previously solved model;
(3) repeatedly solving the enhanced model for the angular distances using circular closure and dynamic reversal techniques until the variation between successive solved angular distances is below a convergence threshold; and
(4) establishing an encoder error map using the selected solved angular distances from the enhanced model.

59. A system as claimed in claim 58, wherein in the enhanced model, an angular distance $\Delta_k$ between sampling events k and k−1 as defined by:

$$\Delta_k = T_k R_k [\omega_0 + aP_k + bP_k^2]$$

wherein
$\omega_0$ is the initial angular speed,
$T_k$ is the period between sampling events k and k−1,
$R_k$ is a correction term defined by $R_k = (e^{cT_k}-1)/cT_k$
c is defined by $c = -\bar{a}/\Delta_0$
$\bar{a}$ is an approximation of the first order damping coefficient previously solved using the model
$\Delta_0$ is the nominal angular distance between sampling events,
a is a first order damping coefficient,
b is a second order damping coefficient, and $\omega_0$ is the initial spindle speed,
P is defined by $$P_k = \sum_{i=1}^{k} \frac{\overline{\Delta}_i}{\Delta_0}, \text{ and}$$

$\overline{\Delta}_i$ is an approximation of angular distance $\Delta_k$ between sampling events k and k−1 from the previously solved model,
is solved by circular closure and dynamic reversal techniques.

60. A system as claimed in claim 59, wherein the circle closure technique is applied to constrain the sum of the angular distances between sampling events to one revolution of the encoder, resulting in vector equation:

$$m = \Delta + aU + bV$$

which expresses a measurement result m as the sum of angular distance vector Δ and an artifact aU+bV.

61. A system as claimed in claim 60, wherein artifact aU+bV is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

62. A system as claimed in claim 61, wherein vectors $U_1$, $V_1$, $U_2$, and $V_2$ are linearly uncorrelated.

63. A system as claimed in to claim 62, wherein the vectors $U_1$, $V_1$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

64. A system as claimed in to claim 63, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

65. A system as claimed in to claim 64, wherein the vectors $U_1$, $V_1$, $U_2$, and $V_2$ are uncorrelated by setting the data sets in each data set pair to be out of phase with one another by half of the total number of sampling events occurring in one revolution of the encoder.

66. A system as claimed in claim 65, wherein the vector pair equations are combined to cancel angular distance vector Δ and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

67. A system as claimed in claim 66, wherein the approximated damping coefficients $a_1$, $b_1$, $a_2$, $b_2$ are applied to the vector pair equations to provide an equation for determining angular distance between sampling intervals as:

$$\overline{\Delta} = m_1 - \overline{a_1} U_1 - \overline{b_1} V_1 \text{ or } \overline{\Delta} = m_2 - \overline{a_2} U_2 - \overline{b_2} V_2.$$

68. A non-transitory computer-readable medium having statements and instruction stored therein for execution by a processor for calibrating a rotary encoder comprising a detectable portion having a plurality of detectable elements about the rotational axis of the encoder and a detector operable to detect the detectable elements and generate an output signal in response to movement of the detectable portion about the rotational axis of the encoder, the processor carrying out the steps of:
(a) rotating the encoder to a selected first speed then allowing the encoder to freely decelerate to a selected second speed over a spindle-free response period;
(b) during a spindle-free response period wherein the encoder is rotated to a selected first speed then allowed to freely decelerate to a selected second speed, receiving output signals from the detector, the signals including a plurality of data sets wherein each data set comprises the periods between sampling events occurring in one revolution of the encoder at an angular speed, each sampling event representing a transition between successive detectable elements of the encoder and each sampling event being spaced an angular distance apart from the preceding sampling event;
(c) selecting a data set pair from the output signals, wherein the data set pair contains two linearly uncorrelated data sets;
(d) defining a model of the angular distances between each sampling event occurring in one revolution of the encoder as a function of one or more damping coefficients and the periods between each sampling event as contained in the data set pair;
(e) solving the model for the angular distances for the data set pair using circular closure and dynamic reversal techniques; and
(f) establishing an encoder error map using the selected solved angular distances from the model.

69. A computer-readable medium as claimed in claim 68, wherein in the model, an angular distance $\Delta_k$ between sampling events k and k−1 as defined by:

$$\Delta_k = T_k(\omega_0 + ak + bk^2)$$

wherein
- $\omega_0$ is the initial angular speed,
- $T_k$ is the period between sampling events k and k−1,
- a is a first order damping coefficient, and
- b is a second order damping coefficient, and $\omega_0$ is the initial spindle speed, is solved by circular closure and dynamic reversal techniques.

70. A computer-readable medium as claimed in claim 69, wherein the circle closure technique is applied to constrain the sum of the angular distances between sampling events to one revolution of the encoder, resulting in vector equation:

$$m = \Delta + aU + bV$$

which expresses a measurement result m as the sum of angular distance vector $\Delta$ and an artifact aU+bV.

71. A computer-readable medium as claimed in claim 70, wherein artifact aU+bV is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

72. A computer-readable medium as claimed in claim 71, wherein vectors $U_1$, $V_1$, $U_2$, and $V_2$ are linearly uncorrelated.

73. A computer-readable medium as claimed in to claim 72, wherein the vectors $U_1$, $V_1$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

74. A computer-readable medium as claimed in to claim 73, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

75. A computer-readable medium as claimed in to claim 74, wherein the vectors $U_1$, $V_1$, $U_2$, and $V_2$ are uncorrelated by setting the data sets in each data set pair to be out of phase with one another by half of the total number of sampling events occurring in one revolution of the encoder.

76. A computer-readable medium as claimed in claim 75, wherein the vector pair equations are combined to cancel angular distance vector $\Delta$ and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

77. A computer-readable medium as claimed in claim 76, wherein the approximated damping coefficients $a_1$, $b_1$, $a_2$, $b_2$ are applied to the vector pair equations to provide an equation for determining angular distance between sampling intervals as:

$$\overline{\Delta} = m_1 - \overline{a_1} U_1 - \overline{b_1} V_1 \text{ or } \overline{\Delta} = m_2 - \overline{a_2} U_2 - \overline{b_2} V_2.$$

78. A system as claimed in claim 68, wherein:
in step (c), a plurality of data set pairs are selected from the output signals;
in step (e), the model is solved for the angular distances for each of the plurality of data set pairs;
step (f) comprises the following steps:
 (i) calculating the repeatability of the angular distances solved for each of the plurality of data set pairs;
 (ii) selecting the angular distances solved for one of the plurality of data set pairs based on the repeatability of the angular distances as compared to the repeatability of the angular distances solved for other data set pairs;
 (iii) establishing an encoder error map using the selected solved angular distances from the model.

79. A computer-readable medium according to claim 68, wherein step (f) comprises the following steps:
 (i) defining an enhanced model of the angular distances between each sampling event occurring in one revolution of the encoder as a function of one or more damping coefficients, the solution of a previously solved model, and the periods between each sampling event as contained in each data set pair;
 (ii) selecting the angular distances solved for a data set pair using the previously solved model;
 (iii) repeatedly solving the enhanced model for the angular distances using circular closure and dynamic reversal techniques until the variation between successive solved angular distances is below a convergence threshold; and
 (iv) establishing an encoder error map using the selected solved angular distances from the enhanced model.

80. A computer-readable medium as claimed in claim 79, wherein in the enhanced model, an angular distance $\Delta_k$ between sampling events k and k−1 as defined by:

$$\Delta_k = T_k R_k [\omega_0 + a P_k + b P_k^2]$$

wherein
- $\omega_0$ is the initial angular speed,
- $T_k$ is the period between sampling events k and k−1,
- $R_k$ is a correction term defined by $R_k = (e^{cT_k} - 1)/cT_k$
- c is defined by $c = -\overline{a}/\Delta_0$
- $\overline{a}$ is an approximation of the first order damping coefficient previously solved using the model
- $\Delta_0$ is the nominal angular distance between sampling events,
- a is a first order damping coefficient,
- b is a second order damping coefficient, and $\omega_0$ is the initial spindle speed,
- P is defined by $$P_k = \sum_{i=1}^{k} \frac{\overline{\Delta}_i}{\Delta_0}, \text{ and}$$

- $\overline{\Delta}_i$ is an approximation of angular distance $\Delta_k$ between sampling events k and k−1 from the previously solved model, is solved by circular closure and dynamic reversal techniques.

81. A computer-readable medium as claimed in claim 80, wherein the circle closure technique is applied to constrain the sum of the angular distances between sampling events to one revolution of the encoder, resulting in vector equation:

$$m = \Delta + aU + bV$$

which expresses a measurement result m as the sum of angular distance vector $\Delta$ and an artifact aU+bV.

82. A computer-readable medium as claimed in claim 80, wherein artifact aU+bV is solved using the dynamic reversal technique, by applying the vector equation to each data set in the data set pair to form vector pair equations:

$$\begin{cases} m_1 = \Delta + a_1 U_1 + b_1 V_1 \\ m_2 = \Delta + a_2 U_2 + b_2 V_2 \end{cases}$$

wherein $m_1$, $U_1$, $V_1$, and $m_2$, $U_2$, $V_2$ are known vectors calculated from the two data sets of the data set pair.

83. A computer-readable medium as claimed in claim 82, wherein vectors $U_1$, $V_1$, $U_2$, and $V_2$ are linearly uncorrelated.

84. A computer-readable medium as claimed in to claim 83, wherein the vectors $U_1$, $V_1$, $U_2$, and $V_2$ are linearly uncorrelated by setting the data sets in each data set pair to be out of phase with one another by a number of sampling events within a range from ten percent of the total number of sampling events occurring in one revolution of the encoder to ninety percent of the total number of sampling events occurring in one revolution of the encoder.

85. A computer-readable medium as claimed in to claim 84, wherein the vectors $U_1$, $V_1$, $U_2$, and $V_2$ are linearly uncorrelated by setting the data sets in each data set pair to be out of phase with one another by a number of sampling events within a range from twenty-five percent of the total number of sampling events occurring in one revolution of the encoder to seventy-five percent of the total number of sampling events occurring in one revolution of the encoder.

86. A computer-readable medium as claimed in to claim 85, wherein the vectors $U_1$, $V_1$, $U_2$, and $V_2$ are uncorrelated by setting the data sets in each data set pair to be out of phase with one another by half of the total number of sampling events occurring in one revolution of the encoder.

87. A computer-readable medium as claimed in claim 86, wherein the vector pair equations are combined to cancel angular distance vector A and to yield a linear equation for unknown parameters $a_1$, $b_1$ and $a_2$, $b_2$ and then approximating first order damping coefficients $a_1$ and $a_2$ and second order damping coefficients $b_1$ and $b_2$ by applying a least-square fit to the linear equation.

88. A computer-readable medium as claimed in claim 87, wherein the approximated damping coefficients $a_1$, $b_1$, $a_2$, $b_2$ are applied to the vector pair equations to provide an equation for determining angular distance between sampling intervals as:

$$\overline{\Delta} = m_1 - \overline{a_1} U_1 - \overline{b_1} V_1 \text{ or } \overline{\Delta} = m_2 - \overline{a_2} U_2 - \overline{b_2} V_2.$$

* * * * *